US008860827B2

(12) United States Patent  
Yamamoto

(10) Patent No.: US 8,860,827 B2  
(45) Date of Patent: Oct. 14, 2014

(54) ZOOM LENS APPARATUS AND IMAGE PICKUP SYSTEM HAVING AN IMAGE STABILZER WITH A LENS POSITIONAL DEVIATION CONTROL, AND OPERATION UNIT THEREOF

(75) Inventor: Osamu Yamamoto, Shimotsuke (JP)

(73) Assignee: Canon Kabushiki Kaisha (JP)

( * ) Notice: Subject to any disclaimer, the term of this patent is extended or adjusted under 35 U.S.C. 154(b) by 356 days.

(21) Appl. No.: 13/186,529

(22) Filed: Jul. 20, 2011

(65) Prior Publication Data

US 2012/0026351 A1 Feb. 2, 2012

(30) Foreign Application Priority Data

Jul. 27, 2010 (JP) ................................. 2010-168191

(51) Int. Cl.
*H04N 5/228* (2006.01)
*G03B 5/00* (2006.01)
*H04N 5/232* (2006.01)

(52) U.S. Cl.
CPC .............. *G03B 5/00* (2013.01); *H04N 5/23287* (2013.01); *G03B 2205/0007* (2013.01); *H04N 5/23258* (2013.01); *G03B 2205/0046* (2013.01)
USPC .................................. 348/208.7; 348/208.11

(58) Field of Classification Search
USPC ................. 348/208.7, 14.01, 208.99, 211.99, 348/220.1, 231.3, 240.3, 335, 345, 347, 348/207.1, 207.11, 208.11
See application file for complete search history.

(56) References Cited

U.S. PATENT DOCUMENTS

| 5,587,739 | A | 12/1996 | Suzuki et al. | |
|---|---|---|---|---|
| 2002/0140803 | A1* | 10/2002 | Gutta et al. | ................. 348/14.01 |
| 2003/0133033 | A1* | 7/2003 | Tanaka | .......................... 348/335 |
| 2005/0024504 | A1* | 2/2005 | Hoshi | ......................... 348/231.3 |
| 2007/0077047 | A1* | 4/2007 | Nomura et al. | .................. 396/55 |
| 2007/0109418 | A1* | 5/2007 | Idemura | .................... 348/211.99 |
| 2008/0199170 | A1* | 8/2008 | Shibuno et al. | ............... 396/125 |

FOREIGN PATENT DOCUMENTS

| JP | 5037849 A | 2/1993 |
|---|---|---|
| JP | 2000-221557 A | 8/2000 |
| JP | 2000221557 A | 8/2000 |
| JP | 3153273 B2 | 1/2001 |

(Continued)

OTHER PUBLICATIONS

Extended European Search Report issued in counterpart European Patent Application 11005413.7-2209 dated Oct. 13, 2011.

(Continued)

*Primary Examiner* — Nicholas Giles  
*Assistant Examiner* — Abdelaaziz Tissire  
(74) *Attorney, Agent, or Firm* — Rossi, Kimms & McDowell LLP

(57) ABSTRACT

A lens apparatus includes; a magnification-varying lens unit, which moves in an optical axis direction during varying magnification, an image stabilization lens unit movable in a direction perpendicular to an optical axis; an image stabilization driving unit for driving the image stabilization lens unit, and an image stabilization controller for controlling the driving of the image stabilization lens unit by the image stabilization driving unit, in which the image stabilization controller controls the image stabilization driving unit to move the image stabilization lens unit so as to reduce a positional deviation of an object image formed at one predetermined point on an image plane, the positional deviation being caused by a movement of the magnification-varying lens unit.

14 Claims, 16 Drawing Sheets

(56) References Cited

FOREIGN PATENT DOCUMENTS

| | | |
|---|---|---|
| JP | 2002-131820 A | 5/2002 |
| JP | 2006-191181 A | 7/2006 |
| JP | 2010-039759 A | 2/2010 |

OTHER PUBLICATIONS

Chinese Office Action cited in Chinese counterpart application No. CN201110210302.8, dated Aug. 12, 2013. English translation provided.

* cited by examiner

FIG. 22
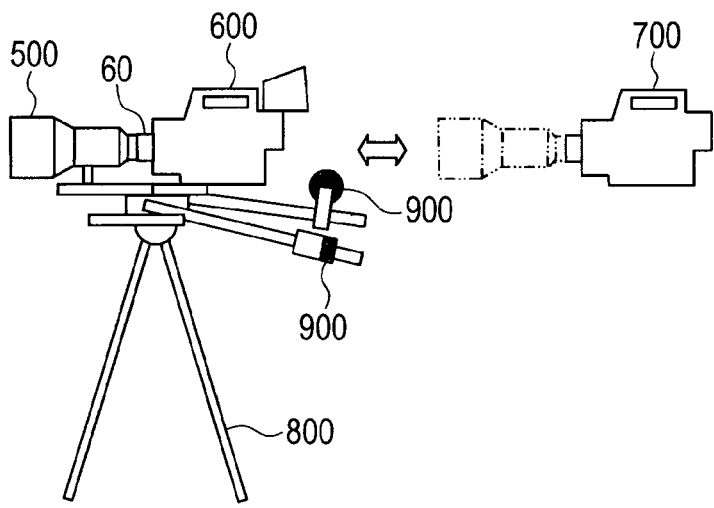
FIG. 23
| Camera | CORRECTION FORMULA |
|---|---|
| a | D(a) |
| b | D(b) |
| c | D(c) |
| ⋮ | ⋮ |
FIG. 24
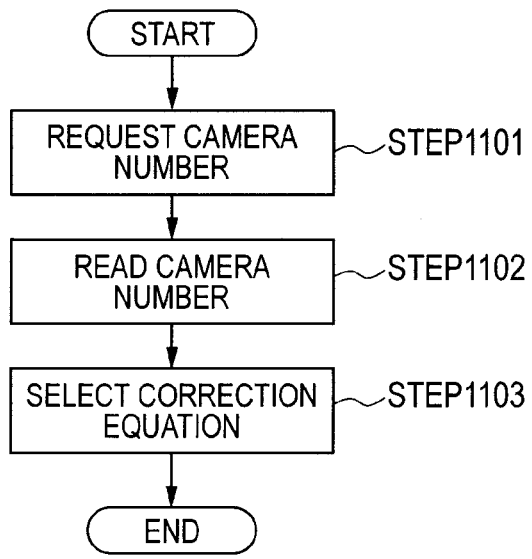

ZOOM LENS APPARATUS AND IMAGE PICKUP SYSTEM HAVING AN IMAGE STABILZER WITH A LENS POSITIONAL DEVIATION CONTROL, AND OPERATION UNIT THEREOF

BACKGROUND OF THE INVENTION

1. Field of the Invention

The present invention relates to a lens apparatus, and more particularly, to a lens apparatus including a zoom mechanism and an image stabilization mechanism, and a control method for the lens apparatus.

2. Description of the Related Art

Japanese Patent Application Laid-Open No. 2000-221557 discloses a technology of correcting, in a digital video image pickup apparatus, a positional deviation of a taken image between zoom positions on a telephoto side and a wide-angle side by moving an image stabilization lens, the positional deviation occurring due to an assembling error of an image pickup element. Japanese Patent Application Laid-Open No. 2000-221557 further discloses that a positional deviation of an optical axis of an optical lens, which occurs during zooming, is also corrected by moving the image stabilization lens.

The conventional image taking apparatus has the following problems inherent therein.

As a digital camera or a video camera, there is an image taking apparatus in which a lens apparatus including optical lenses and an image pickup apparatus including an image pickup element are connected removably to each other through a mount portion of the lens apparatus and the image pickup apparatus, to thereby allow various combinations of the lens apparatus and the image pickup apparatus depending on an image taking situation. Optical axis positions of the lens apparatus and the image pickup apparatus are adjusted separately when the lens apparatus and the image pickup apparatus are assembled at the respective manufacturers, and if the same connection method for the mount portion is employed, the lens apparatus and the image pickup apparatus may be connected to each other even though the manufacturers are different. The lens apparatus and the image pickup apparatus are mounted and removed through the mount portion when an operator replaces the lens apparatus or the image pickup apparatus depending on the image taking situation, and when the operator separates the lens apparatus and the image pickup apparatus from each other for easier portability during transportation. At this time, in the lens apparatus and the image pickup apparatus which are adjusted separately, their optical axis positions may deviate from each other due to an error in adjustment or an error in precision of parts. Hence, when the lens apparatus and the image pickup apparatus are connected to each other, there may occur a positional deviation of a taken image between the telephoto side and the wide-angle side of the zoom. If a positional deviation of the optical axis further occurs during zooming in the lens apparatus due to an error in adjustment or an error in precision of parts, the positional deviations caused by different factors have occurred at two sites as a consequence. If such positional deviations occur, at a time when a zoom operation is performed on an object, there occurs a deviation of the position in a display at which the object is shown. In a case of an apparatus having an autofocus function, on the other hand, a distance measurement point and distance measurement mark of the autofocus do not match each other, resulting in a problem for the focus operation.

However, the conventional image taking apparatus cannot suppress the positional deviation occurring when the lens apparatus and the image pickup apparatus are connected to each other after shipment from the respective manufacturers. In particular, if the same connection method for the mount portion is employed, the apparatuses from the different manufacturers may be connected to each other. In this case, no information may be obtained on the respective optical axes, resulting in a problem.

SUMMARY OF THE INVENTION

In view of the above, the present invention has an exemplary object to provide a lens apparatus capable of simply adjusting and correcting, in a combination of a removable lens apparatus and a removable image pickup apparatus, a positional deviation of an optical axis due to a mounting error, and further capable of correcting a positional deviation suitably for an unspecific combination of a lens apparatus and an image pickup apparatus.

According to the present invention, there is provided a lens apparatus, including: a magnification-varying lens unit, which moves in an optical axis direction during varying magnification; an image stabilization lens unit movable in a direction perpendicular to an optical axis; an image stabilization driving unit for driving the image stabilization lens unit; and an image stabilization controller for controlling the driving of the image stabilization lens unit by the image stabilization driving unit, in which the image stabilization controller controls the image stabilization driving unit to move the image stabilization lens unit so as to reduce a positional deviation of an object image formed at one predetermined point on an image plane, the positional deviation being caused by a movement of the magnification-varying lens unit.

Further features of the present invention will become apparent from the following description of exemplary embodiments (with reference to the attached drawings).

According to the present invention, there may be provided a lens apparatus capable of simply adjusting and correcting, in a combination of a removable lens apparatus and a removable image pickup apparatus, a positional deviation of an optical axis due to a mounting error, and further capable of correcting a positional deviation suitably for an unspecific combination of a lens apparatus and an image pickup apparatus.

Further features of the present invention will become apparent from the following description of exemplary embodiments with reference to the attached drawings.

BRIEF DESCRIPTION OF THE DRAWINGS

FIG. 22 is a schematic view illustrating an overview of an image taking apparatus according to the fifth embodiment of the present invention.

FIG. 23 is a table showing an overview of a correction list according to the fifth embodiment of the present invention.

FIG. 24 is a flow chart of correction according to the fifth embodiment of the present invention.

DESCRIPTION OF THE EMBODIMENTS

Hereinafter, exemplary embodiments of the present invention are described in detail with reference to the attached drawings.

Figure 1:
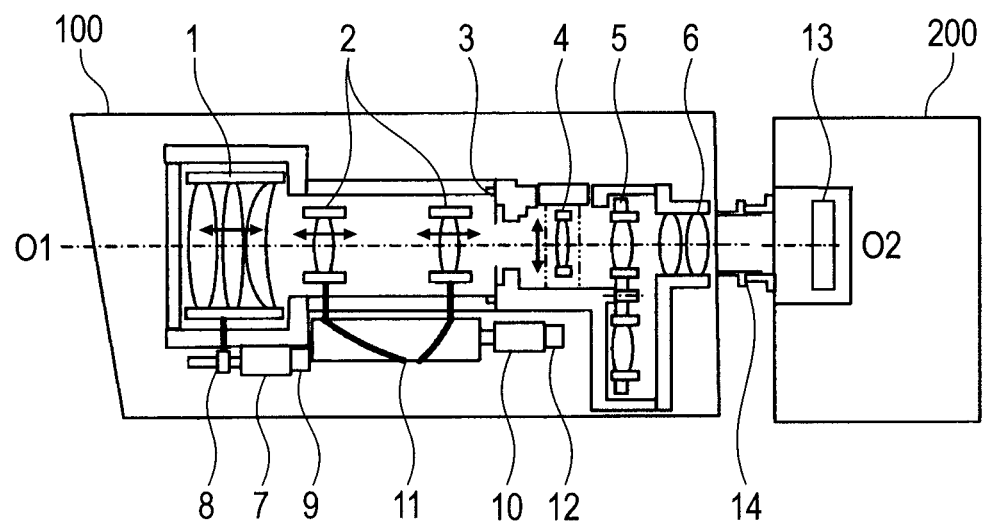
FIG. 1 is a schematic view illustrating an overview of a lens apparatus according to the present invention.

FIG. 1 is a schematic view illustrating an overview of an inside of a lens apparatus having a configuration of the present invention.

Referring to FIG. 1, a lens apparatus 100 includes optical units arranged sequentially inside, specifically, the lens apparatus 100 includes, in order from the front side (from an object side), a focus lens unit 1, a zoom lens group 2, an iris mechanism 3, an image stabilization lens unit 4, an optical switching unit 5 including multiple optical lens units, and a relay lens unit 6.

The focus lens unit 1 moves in a direction of a lens optical axis O1 by a motor 7 and a rectilinear driving mechanism 8 to adjust the focus. Further, the motor 7 is provided with a focus position sensor 9 for measuring a position of the focus lens unit 1.

The zoom lens group 2 is a lens unit capable of changing a focal length, and is movable in the optical axis direction. The zoom lens group includes two lens units (variator (front side corresponding to object side) and compensator (rear side corresponding to image plane side)) which move in the optical axis direction during magnification-varying (during zooming). Those lens units are driven in the optical axis direction by a motor 10 serving as a magnification-varying driving unit through a cam shaft 11. Further, the motor 10 is provided with a zoom position sensor 12 for measuring a position of the zoom lens group 2.

The iris mechanism 3 is constituted by multiple aperture blades (not shown), and an aperture stop diameter formed by the aperture blades is adjusted by using a driving mechanism (not shown), to thereby change the aperture stop diameter.

The image stabilization lens unit 4 is movable in a direction perpendicular to the optical axis O1 by a driving mechanism serving as an image stabilization driving unit, which is described later. The image stabilization lens unit 4 moves in such a direction as to suppress a blur of a taken image when the lens apparatus 100 is influenced by vibrations from outside the apparatus. The optical switching unit 5 includes multiple lens units different in magnification-varying ratio, and the respective lens units are fixed to the optical switching unit 5, so as to be removably inserted into an image taking optical path by a rotational mechanism described later, which enables magnification to vary to a predetermined value depending on the magnification-varying ratio of the lens unit inserted into the image taking optical path.

The lens apparatus 100 is connected to an image pickup apparatus 200 including an image pickup element 13 through a mount portion 14. The mount portion 14 is a known lens mount employed in a single-lens reflex camera or video camera of lens interchangeable type, and removably connects the lens apparatus 100 and the image pickup apparatus 200 to each other. At the time of connection, the lens apparatus 100 and the image pickup apparatus 200 are connected to each other so that the lens optical axis O1 becomes coaxial with a camera optical axis O2 situated at the scanning center of the image pickup element. The image pickup element 13 receives beam from an object through the respective optical lenses of the lens apparatus 100. Note that, the mount portion 14 may connect other lens apparatus and image pickup apparatus in combination, which have the same shape of the mount.

Hereinafter, referring to FIG. 2, a configuration of the image stabilization lens unit 4 is described.

Figure 2:
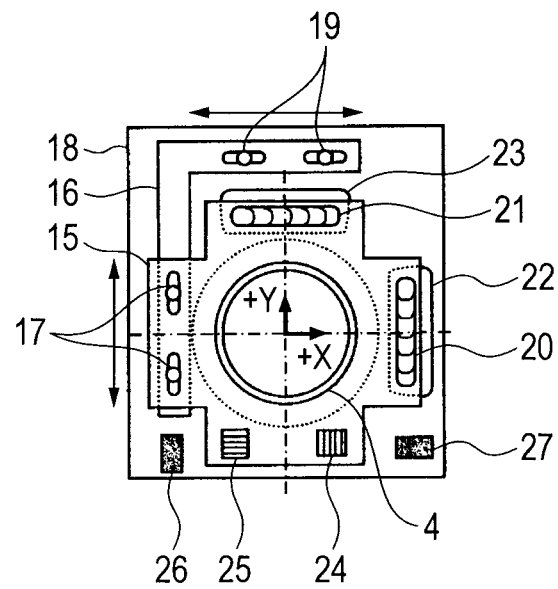
FIG. 2 is a schematic view illustrating an overview of an image stabilization unit of the lens apparatus according to the present invention.

FIG. 2 is a view illustrating the image stabilization lens unit 4 and its peripheral mechanisms as viewed from the right side of FIG. 1. The image stabilization lens unit 4 is held by a holding frame 15, and the holding frame 15 is connected to a guide arm 16 so as to be slidable in a Y direction, that is, a pitch direction, through two pitch directional sliding units 17. In addition, the guide arm 16 is connected to a base 18 so as to be slidable in an X direction, that is, a yaw direction, through two yaw directional sliding units 19. Further, the holding frame 15 is provided with a coil 20 and a coil 21, and the coils 20 and 21 are opposed to magnetized magnets 22 and 23, respectively.

The magnets 22 and 23 are each fixed to the base 18 as a yoke. When power is supplied to the coils 20 and 21, magnetic fields are generated and combined with magnetic fields of the opposing magnets 22 and 23 to generate electromagnetic forces, respectively. With the coil 20 and the magnet 22, an electromagnetic force in the Y direction (up and down direction), that is, the pitch direction, acts depending on a direction of a current of the coil 20, and the image stabilization lens unit 4 and the holding frame 15 are driven in the pitch direction through the pitch directional sliding units 17. Similarly, with the coil 21 and the magnet 23, an electromagnetic force in the X direction (left and right direction), that is, the yaw direction, acts depending on a direction of a current of the coil 21, and the image stabilization lens unit 4 and the holding frame 15 are driven in the yaw direction through the yaw directional sliding units 19. Further, the holding frame 15 is provided with a yaw directional position sensor 24 and a pitch directional position sensor 25 for detecting a movement position of the holding frame 15. Further, the base 18 is provided with gyroscopes 26 and 27 for detecting angular velocities generated due to vibrations in the pitch direction and the yaw direction, respectively.

Hereinafter, referring to FIG. 3, an internal configuration of the optical switching unit 5 is described.

Figure 3:
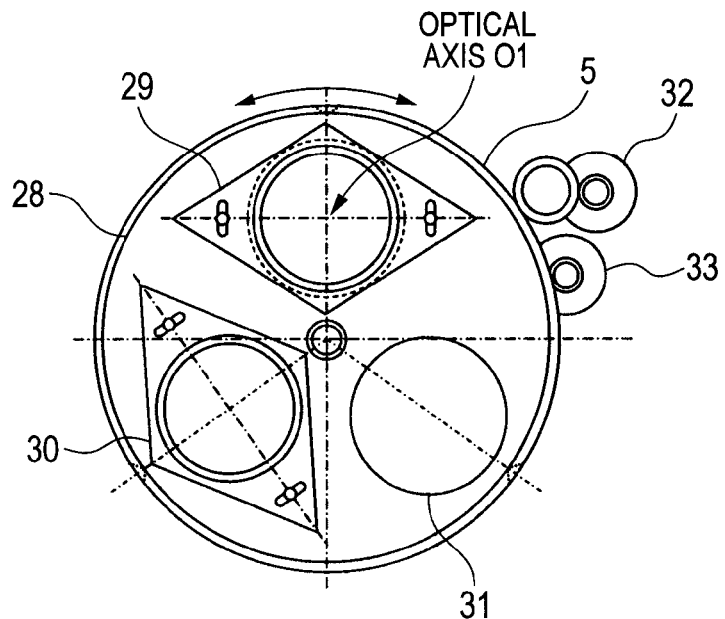
FIG. 3 is a schematic view illustrating a configuration of a switching unit of the lens apparatus according to third to fifth embodiments of the present invention.

FIG. 3 is a view illustrating the optical switching unit 5 as viewed from the right side of FIG. 1. On a rotational plate 28, there are arranged magnification-varying lens units 29 and 30 serving as a magnification-varying optical system, and a weight 31 having substantially the same mass as the respective lens units, the magnification-varying lens units 29 and 30 and the weight 31 being arranged substantially equiangularly by 120° about the center of the rotational plate 28.

In the state of FIG. 3, the magnification-varying lens unit 29 is moved (inserted) into the image taking optical path. On the circumference of the rotational plate 28, there are arranged a switch driver 32 for rotating the rotational plate 28, and a rotational position sensor 33 for detecting a rotational position of the rotational plate 28. When the rotational plate 28 is rotated by the switch driver 32, the rotational plate 28 rotates about a center of the rotational plate 28 as a rotational center, and performs both forward rotation and reverse rotation, with the result that the magnification-varying lens units 29 and 30 are respectively inserted into the image taking optical path. At this time, the weight 31 functions as a balancer with the rotational center set as the center of gravity, to thereby suppress rotation unevenness during rotation.

Hereinafter, referring to FIGS. 4A and 4B, a configuration of an operation portion of the lens apparatus 100 is described.

Figure 4A:
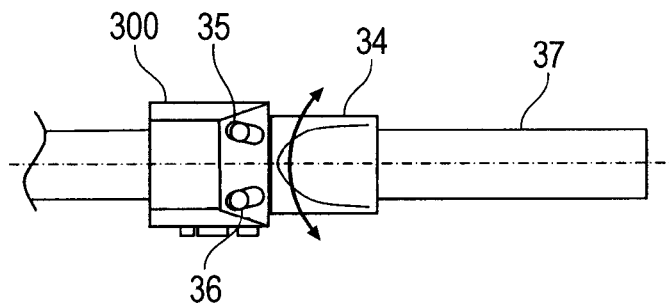
FIGS. 4A and 4B are views illustrating a configuration of an operation portion of the lens apparatus according to the present invention.
Figure 4B:
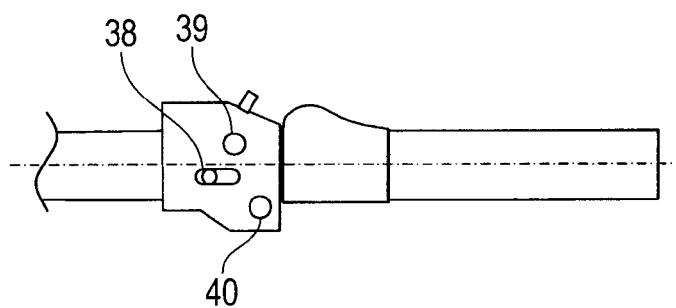

FIGS. 4A and 4B are schematic views illustrating a zoom operation portion 300 of the lens apparatus 100 having the configuration of the present invention as top view and side view, respectively. In FIG. 4A, a zoom operation ring 34, a magnification varying switch 35, an image stabilization activating switch 36, and an operation arm 37 are provided. Further, in FIG. 4B, a correction activating switch 38, a preset switch 39, and a direction switch 40 are provided. The zoom operation ring 34 is rotatable about a rotational axis set as a center line indicated by the chain line of FIGS. 4A and 4B so as to perform the zoom operation (magnification-varying operation) for the lens apparatus 100. In response to the rotation of the zoom operating ring 34, the zoom lens group 2 is driven through the motor 10 and the cam shaft 11, and accordingly the focal length changes. The magnification varying switch 35 is used for selecting which of the magnification-varying lens units 29 and 30 of the optical switching unit 5 is to be inserted into the image taking optical path. After the selection, the rotational plate 28 rotates through the switch driver 32, and the desired magnification-varying lens unit is inserted into the image taking optical path. The image stabilization activating switch 36 is used for selecting whether or not to activate the image stabilizing by the mechanism of the image stabilization lens unit 4 of FIG. 2. The operation arm 37 is used for performing a pan/tilt operation on the lens apparatus 100 and the image pickup apparatus 200.

The correction activating switch 38 is used as a correction activating unit, which is used as a switch for activating correction control when correcting the positional deviation of the optical axis occurring in the lens apparatus 100, and the positional deviation of the optical axis between the lens apparatus 100 and the image pickup apparatus 200. When the correction activating switch 38 is turned ON, the zoom operation ring 34 is switched into an operation ring as an image stabilization lens driving operation unit for moving and operating the image stabilization lens unit 4. The preset switch 39 is used as a storage operation unit for supplying a trigger signal to be used for storing a position of the image stabilization lens unit 4 at the time of correcting the positional deviation. The direction switch 40 is used for changing a movement direction of the image stabilization lens unit 4 moving through the zoom operation ring 34. Note that, the zoom operation portion 300 is installed on a tip end of the operation arm extending from an operation base (not shown) capable of panning and tilting, on which the lens apparatus 100 and the image pickup apparatus 200 are mounted. The positional deviation of the optical axis herein indicates that an object image situated at a center of an imaging plane moves in a direction perpendicular to the optical axis due to the movement of the zoom lens group 2 (zoom lens group 2 including a lens which is unintendedly tilted or shifted) in the optical axis direction.

Hereinafter, referring to FIG. 5, configurations of control blocks of the lens apparatus 100, the image pickup apparatus 200 and their peripheral apparatuses are described.

Figure 5:
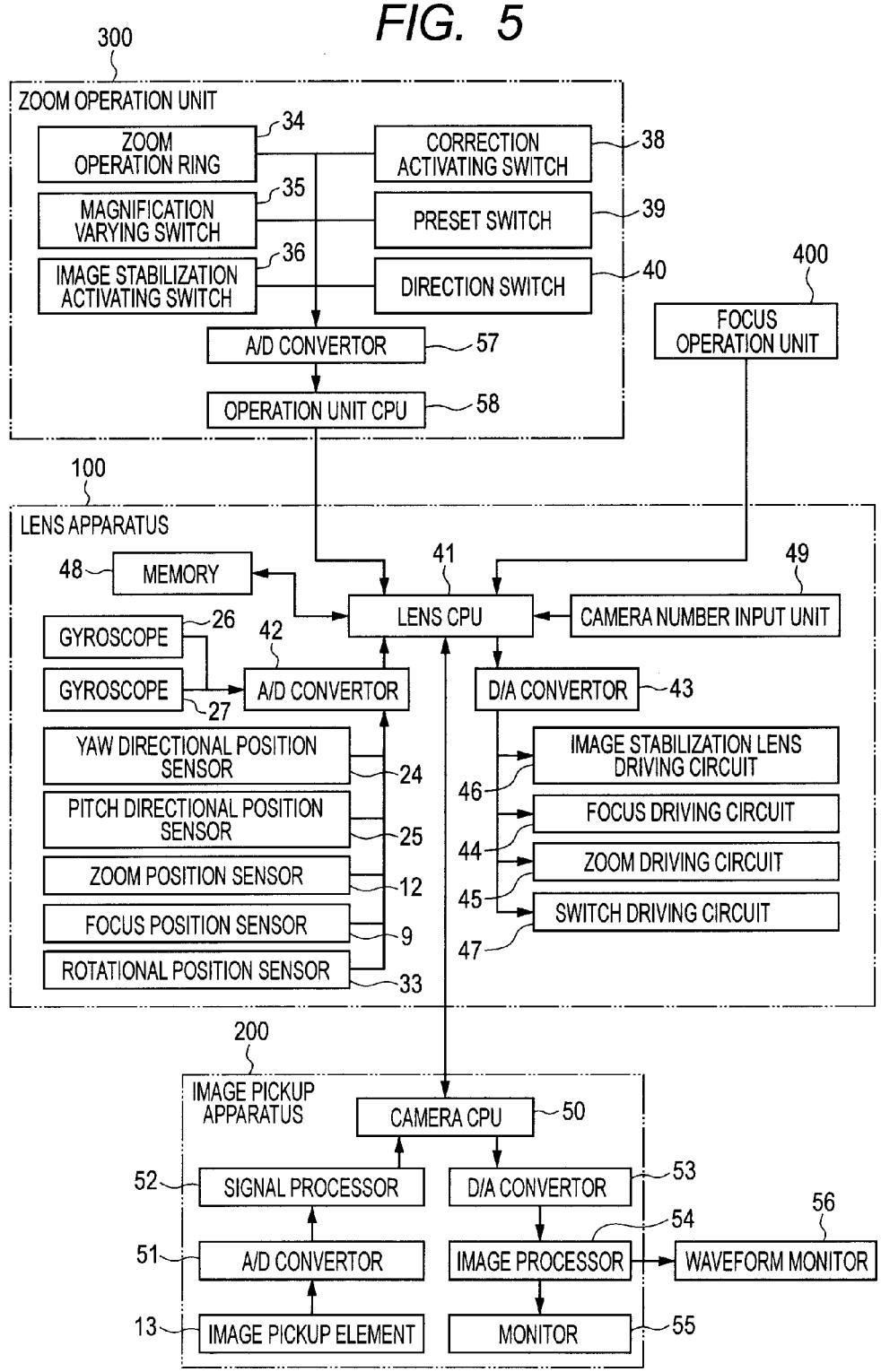
FIG. 5 is a block diagram illustrating configurations of control blocks of the lens apparatus, an image pickup apparatus and peripheral apparatuses according to the present invention.

In FIG. 5, a lens CPU 41 is a controller for controlling the operation of the lens apparatus 100. The lens CPU 41 controls the driving of the focus, zoom, iris and image stabilization, and transmits commands and processes various kinds of information through communication to the image pickup apparatus 200, the zoom operation portion 300 and a focus operation portion 400.

An electric signal indicating the position of the focus lens unit 1 in the optical axis direction, which is obtained by the focus position sensor 9, is input to the lens CPU 41 through an A/D convertor 42. The focus position sensor 9 converts the position of the focus lens unit 1 in the optical axis direction into a voltage, which is then converted into a digital signal by the A/D convertor 42, and is input to the lens CPU 41. The zoom position sensor 12 converts the position of the zoom lens group 2 in the optical axis direction into a voltage, which is then converted into a digital signal by the A/D convertor 42, and is input to the lens CPU 41. The aperture stop diameter of the iris is detected by a sensor (not shown), and is input to the lens CPU 41 through the A/D convertor 42.

Hereinafter, the image stabilization is described. When the gyroscopes 26 and 27 detect the vibrations imposed on the lens apparatus 100, the gyroscopes 26 and 27 convert the angular velocities generated due to the vibrations into a voltage, which is converted into a digital signal through the A/D convertor 42, and is input to the lens CPU 41. Further, the yaw directional position sensor 24 and the pitch directional position sensor 25 for detecting the positions of the image stabilization lens unit 4 in the respective yaw and pitch directions convert the positions into voltages, which are then converted into digital signals by the A/D convertor 42, and are input to the lens CPU 41. In addition, in the optical switching unit, the rotational positions of the magnification-varying lens units 29 and 30 are detected by the rotational position sensor 33, and the rotational positions are converted into voltages, which are then converted into digital signals by the A/D convertor 42, and are input to the lens CPU 41.

The lens CPU 41 performs software processing according to the respective pieces of input information described above to generate control signals for driving the focus, zoom, iris, image stabilization and optical switching unit. Those control signals are converted into analog signals by a D/A convertor 43, which are then transmitted to a focus driving circuit 44, a zoom driving circuit 45, an iris driving circuit (not shown), an image stabilization lens driving circuit 46 and a switch driving circuit 47. Regarding the focus, the motor 7 rotates through driving control by the focus driving circuit 44 to drive the focus lens unit 1 in the direction of the optical axis O1 through the rectilinear driving mechanism 8. Regarding the zoom, the motor 10 rotates through driving control by the zoom driving circuit 45 to drive the zoom lens group 2 in the direction of the optical axis O1 through the cam shaft 11. Regarding the iris, the iris mechanism 3 changes the aperture stop diameter through driving control by the iris driving circuit. Regarding the image stabilization, through driving control by the image stabilization lens driving circuit 46, the coil 20 and the magnet 22 generate the electromagnetic force in the pitch direction while the coil 21 and the magnet 23 generate the electromagnetic force in the yaw direction, to thereby drive the image stabilization lens unit 4 in the respective directions. In addition, regarding the optical switching unit, the switch driving portion 32 rotates the rotor plate 28 through driving control by the switch driving circuit 47.

A memory 48 is a storage unit for storing the position of the image stabilization lens unit 4, and stores positional information acquired by the lens CPU 41 from the yaw directional position sensor 24 and the pitch directional position sensor 25. The memory 48 is controlled by the lens CPU 41 for temporary writing/reading and deletion.

Hereinafter, a camera number input unit 49 serving as a camera information inputting unit is an input unit for inputting apparatus information of the image pickup apparatus connected to the lens apparatus 100. When the apparatus information is input, the apparatus information is transmitted to the lens CPU 41, and is stored in the memory 48. In FIGS. 1 and 5, the image pickup apparatus 200 is connected to the lens apparatus 100, and hence, in this case, when the apparatus information of the image pickup apparatus 200 is input, the apparatus information is stored in the memory 48.

Under the state in which the lens apparatus 100 is connected to the image pickup apparatus 200, the lens CPU 41 is communicable to a camera CPU 50, to thereby perform communication of commands and various control signals. From the lens apparatus 100, pieces of information on the positions and settings of the focus, zoom, iris, image stabilization and optical switching unit are provided, while from the image pickup apparatus 200, the lens CPU 41 receives, for example, a command of an iris opening diameter according to a beam receiving state of the image pickup element 13 to perform driving on the lens side. Under the state in which the lens apparatus 100 is connected to the zoom operation portion 300 and the focus operation portion 400, the lens CPU 41 also communicates with CPUs on the operation portion side to receive input signals from the respective operation portions.

Hereinafter, the image pickup apparatus 200 is described. In the image pickup apparatus 200, an optical image obtained through the optical system of the lens apparatus 100 is converted into a voltage by the image pickup element 13 through photoelectric conversion, and the voltage is converted into a digital signal by an A/D convertor 51 for each scanned element. After that, a signal processor 52 performs frame processing and gradation processing on the digital signal to generate an image signal. Then, the image signal is converted into an analog signal by a D/A convertor 53 through the camera CPU 50, and an image processor 54 performs filtering processing for a frequency band. After that, the resultant signal is output to a monitor 55. A waveform monitor 56 is an image monitor capable of outputting a waveform on an image scanning line, which is to be used for correction of the positional deviation of the optical axis described later. The image signal is sent to the waveform monitor 56 through the image processor 54 of the image pickup apparatus 200.

Hereinafter, the zoom operation portion 300 is described. When an operator operates the zoom operation ring 34, a rotation sensor (not shown) provided to the ring detects a rotational angle of the zoom operation ring 34, and a voltage obtained through the detection is converted into a digital signal by an A/D convertor 57. Then, the digital signal is transmitted from an operation portion CPU 58 to the lens CPU 41 as an input command signal. When receiving the input command, the lens CPU 41 sets a target position, which is variably determined based on an input value of the zoom operation portion 300 and an initial position of the zoom lens group 2 obtained from the zoom position sensor 12. Thus, the lens CPU 41 drives the zoom lens group 2 through the D/A convertor 43 and the zoom driving circuit 45. Further, inputs from various switches provided to the zoom operation portion 300, that is, inputs from the magnification varying switch 35, the image stabilization activating switch 36, the correction activating switch 38, the preset switch 39 and the direction switch 40, are converted into digital signals by the A/D convertor 57. Then, the digital signals are transmitted to the operation portion CPU 58 as input command signals to be used for various setting changes, and then sent to the lens CPU 41.

Regarding the focus operation portion 400, similarly to the zoom operation portion 300, a sensor (not shown) detects an operation amount obtained through a focus adjustment operation performed by a focus operation member (not shown), and a voltage obtained through the detection is converted into a digital signal by an A/D convertor (not shown). Then, the digital signal is transmitted from a CPU (not shown) of the focus operation portion 400 to the lens CPU 41 as an input command signal.

When receiving the command, the lens CPU 41 sets a target position, which is variably determined based on an input value of the operation portion and an initial position of the focus lens unit 1 obtained from the focus position sensor 9. Thus, the lens CPU 41 drives the focus lens unit 1 through the D/A convertor 43 and the focus driving circuit 44.

By the way, the camera number input unit 49 of FIG. 5 is included in the lens apparatus 100, but may instead be included in the zoom operation portion 300 or the focus operation portion 400, and may therefore transmit pieces of input information to the lens CPU 41 through the CPUs of the respective operation portions. Further, the camera number input unit 49 may be included in the image pickup apparatus, and may therefore input information through command communication to the camera CPU described later. The zoom operation ring 34 is also used for correcting the positional deviation of the optical axis, but the correction may instead be performed by the focus operation member of the focus operation portion 400 which may obtain the same adjustment amount as the zoom operation ring 34. At this time, various switches of the zoom operation unit 300 illustrated in FIG. 5 may be provided to the focus operation portion 400.

First Embodiment

Referring to FIGS. 6 to 10, a lens apparatus according to a first embodiment of the present invention is described.

Under an ideal condition, an image point of the object, which is situated on the lens optical axis, rests on a predetermined point on an image plane, and is not displaced depending on a zoom magnification. Thus, when the optical axis of the lens apparatus matches the center of the imaging plane, an object image formed at the center of the imaging plane does not move depending on the zoom magnification. However, when the optical axis of the lens apparatus does not match the center of the imaging plane, an image in an angle of field corresponding to the zoom magnification is taken on the imaging plane with the position of the lens optical axis within the imaging plane as the center. Accordingly, the object image formed at the center of the imaging plane moves due to the change in zoom magnification (change in focal length through the movement of the magnification-varying lens unit), resulting in unnatural movement of the image (positional deviation) which the operator does not intend. It is therefore an object of this embodiment to provide a lens apparatus in which, even if the connection between the lens apparatus and the image pickup apparatus causes the situation in which the position of the optical axis of the lens apparatus does not match the center of the imaging plane of the image pickup apparatus, the object image at the center of the imaging plane is not displaced depending on a change in image pickup magnification.

Figure 6:
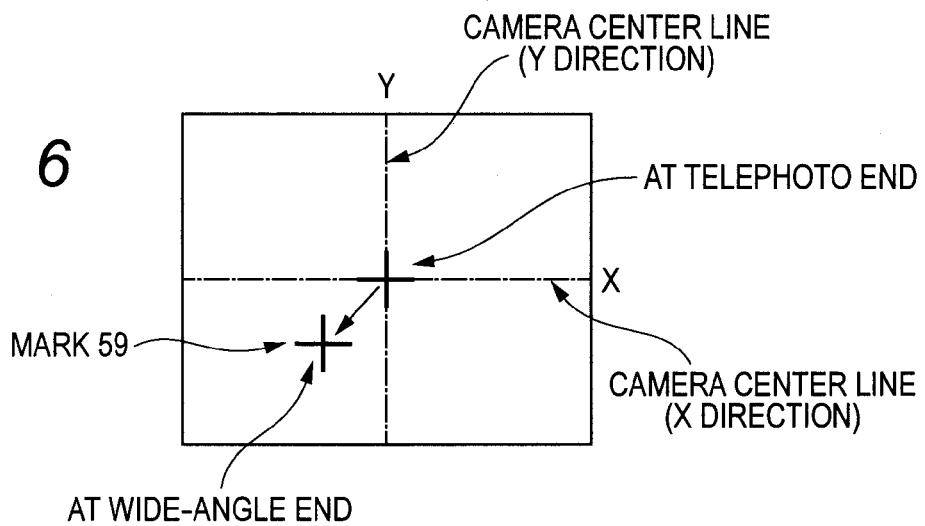
FIG. 6 is an explanatory diagram illustrating a state in which a positional deviation of an optical axis at the time when the lens apparatus and the image pickup apparatus are connected to each other is present.
Figure 7:
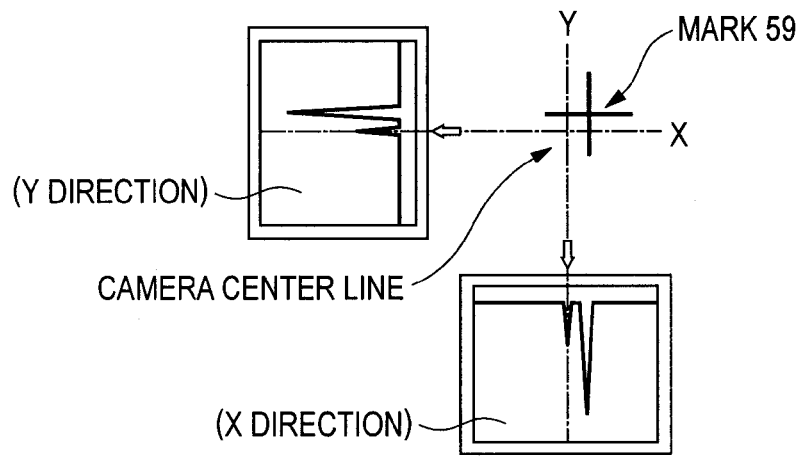
FIG. 7 is an illustration of an image on a waveform monitor at the time when an in-focus state is achieved on a cross-shaped object after the lens apparatus and the image pickup apparatus are connected to each other.

FIG. 6 illustrates an image on the monitor 55 at the time when an image of a cross-shaped mark 59 is taken in an in-focus state after the lens apparatus 100 and the image pickup apparatus 200 are connected to each other. At this time, the operator operates the operation arm 37 (performs pan/tilt operation) so that the position of the mark 59 matches camera center lines of an image taking screen in longitudinal (Y) and lateral (X) directions which are displayed on the monitor 55 under a condition where a zoom position of the lens is at a telephoto end. Thus, the position of the mark 59 is aligned with the position of the center of the image pickup element of the image pickup apparatus 200. In FIG. 7, the intersection of the longitudinal and lateral center lines indicates a scanning center of the image pickup element 13. When the operator subsequently operates the zoom operation ring 34 to shift the zoom position toward a wide-angle side, the position of the mark 59 may deviate from the camera center (center of the imaging plane) as illustrated in FIG. 6, resulting in the largest deviation at the wide-angle end. Conversely, when the operator aligns the positions of the mark 59 and the camera center at the wide-angle end and then shifts the zoom position toward the telephoto side, the angle of field becomes narrower and hence the optical lens is generally high on the telephoto side in sensitivity of the positional deviation of the optical axis, with the result that the amount of the positional deviation is larger as compared to the shift from the telephoto end to the wide-angle end. This phenomenon is a positional deviation occurring due to the fact that the optical axes O1 and O2 of FIG. 1 does not match each other due to an error in mounting the image pickup apparatus 200 if there is no influence of the positional deviation during zooming of the lens apparatus 100. This positional deviation does not occur if the lens apparatus and the image pickup apparatus are adjusted in advance.

If the positional deviation does occur, the positional deviation can be suppressed as long as the positional deviation is corrected in advance by an image stabilization lens as in the case of the conventional image taking apparatus. However, the lens apparatus 100 to be connected by using the mount portion 14 for mounting/removing the lens apparatus is not necessarily connected to the image pickup apparatus 200, and hence it is not effective to correct the position for a specific combination.

Referring to FIG. 7 and subsequent figures, in view of the problem described above, flows for suitably correcting the positional deviation in the configuration in which the lens apparatus and the image pickup apparatus are removable are described.

FIG. 7 is an illustration of an image on the waveform monitor 56 at the time when the image of the cross-shaped mark 59 of the object is taken in the in-focus state after the lens apparatus 100 and the image pickup apparatus 200 are connected to each other. The display of the monitor is partitioned for the longitudinal (Y) and lateral (X) directions, and image outputs of specific scanning lines situated near the camera center are displayed for the respective directions. In FIG. 7, the mark 59 deviates from the camera center, and at this time, a waveform of a line width of the mark 59 and a waveform of a line width of the camera center line are output for each of the X and Y directions. The operator operates the operation arm 37 or moves the image stabilization lens unit in a correction operation described later, to thereby align the positions so that the waveform of the line width of the mark 59 matches the line width of the camera center line.

Note that, the waveform monitor 56 is used for accurate position alignment, but if the monitor 55 is high in resolution and hence allows the accurate position alignment, the monitor 55 may be used instead. Further, the cross-shaped mark 59 is used for the position alignment, but the present invention is not limited to the shape, and any mark may be used as long as the center positions in the longitudinal (Y) and lateral (X) directions can be read from the difference in contrast.

Hereinafter, referring to an explanatory diagram of FIG. 8 and a flow chart of FIG. 9, the correction operation and the software processing of the lens CPU 41 serving as an image stabilization controller in a case where the positional deviation due to the error in mounting the lens apparatus and the image pickup apparatus is present are described.

Figure 9:
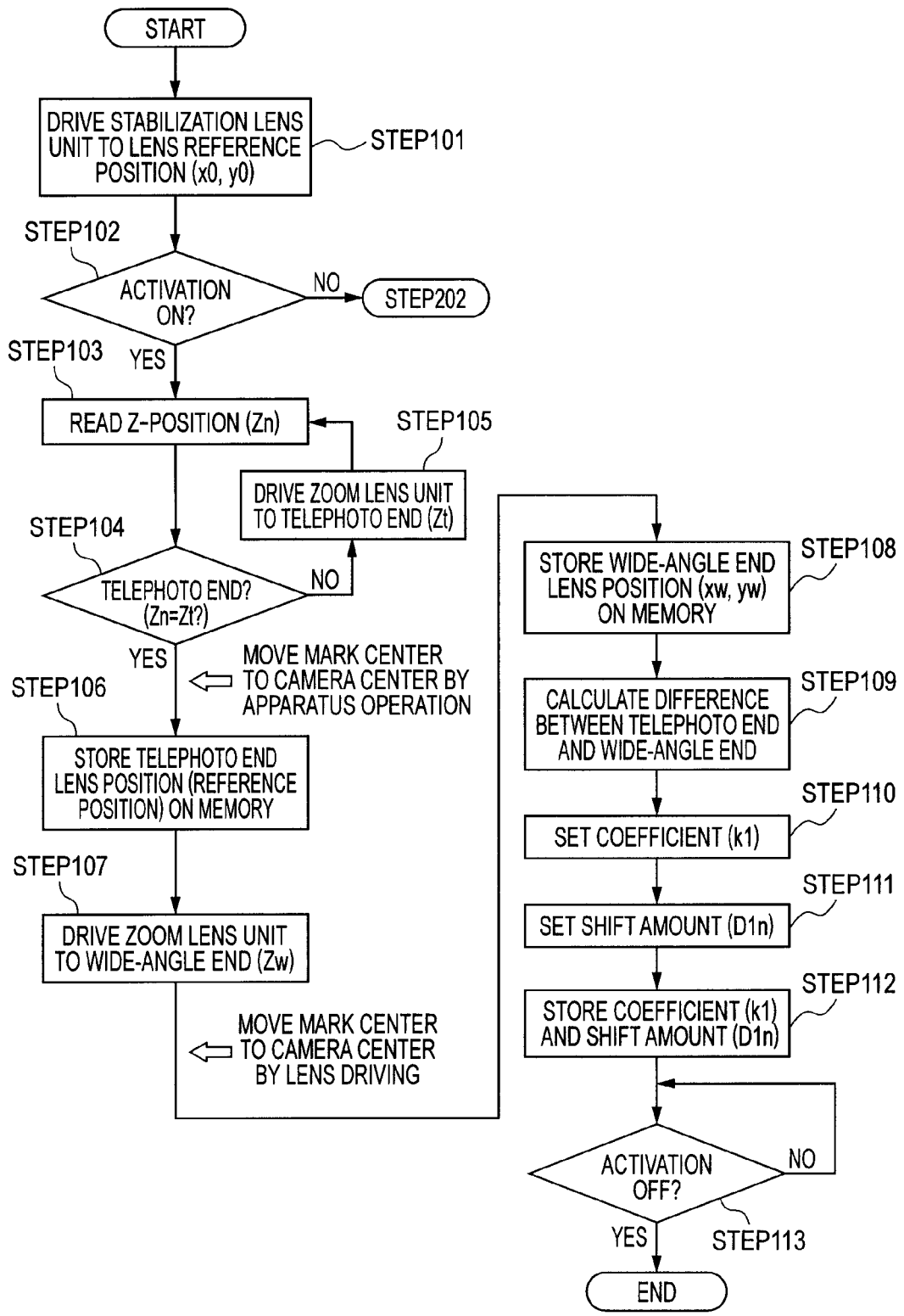
FIG. 9 is a flow chart of correction performed in the case where the positional deviation of the optical axis due to the error in mounting the lens apparatus and the image pickup apparatus is present according to a first embodiment of the present invention.

Referring to FIG. 9, when power is supplied to the lens apparatus 100 and the image pickup apparatus 200, the lens CPU 41 moves the image stabilization lens unit 4 to a reference position (x0, y0) stored in advance in the memory 48, which matches the optical axis O1. The image stabilization lens unit 4 is moved to the reference position in the following manner. That is, the yaw directional position sensor 24 and the pitch directional position sensor 25 are used to read the position of the image stabilization lens unit 4, then the target reference position is set, and then the image stabilization lens unit 4 is driven by the coils 20 and 21, and the magnets 22 and (STEP 101). After the activation, the lens CPU 41 checks whether or not the correction activating switch 38 is ON (STEP 102). When the correction activating switch 38 is ON, the lens CPU 41 determines that the mode is switched into a correction mode, and proceeds to the next step. When the correction activating switch 38 is OFF, the lens CPU 41 determines that the correction is not performed, and proceeds to an operation of FIG. 10 described later. Subsequently, the lens CPU 41 acquires a lens zoom position Zn from the zoom position sensor 12 (STEP 103). When the value of Zn is a value Zt which is the value of the telephoto end, the lens CPU 41 directly proceeds to the next step (STEP 104). When the value of Zn is not Zt, the lens CPU 41 drives the zoom lens group 2 to the position at the telephoto end through the zoom driving circuit 45 (STEP 105). Then, the lens CPU 41 reads Zn again in STEP 103, and after the lens CPU 41 confirms that Zn=Zt in STEP 104, the lens CPU 41 proceeds to the next step. At this time, the operator uses the focus operation portion 400 to drive the focus lens unit 1, to thereby perform focusing on the mark 59. Then, the operator operates the operation arm 37 to adjust pan/tilt directions of the lens apparatus 100 and the image pickup apparatus 200 so that the center position of the mark 59 that is the object matches the camera center (center of the image taking screen (imaging plane)). At this time, the use of the waveform monitor 56 of FIG. 7 facilitates the position alignment.

Figure 8:
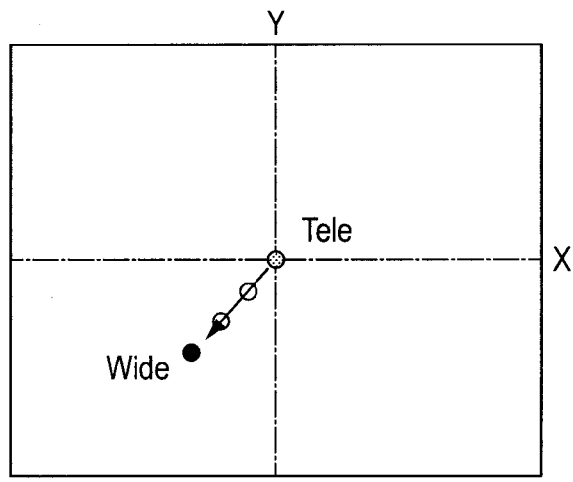
FIG. 8 is a diagram illustrating movement of a mark center from a telephoto end to a wide-angle end in a case where the positional deviation of the optical axis due to an error in mounting the lens apparatus and the image pickup apparatus is present.

FIG. 8 is a diagram exemplifying displacement of the mark center at the time of performing the zoom operation to the wide-angle end under the state in which the pan/tilt directions are adjusted so that the mark center matches the camera center at the telephoto end. When the operator presses the preset switch 39 of the zoom operation portion 300, current position of the image stabilization lens unit 4 can be stored. When the lens CPU 41 confirms an input signal of the preset switch 39, the lens CPU 41 reads the zoom position Zt and an output value (xt, yt) of the yaw directional position sensor 24 and the pitch directional position sensor 25 (position of the image stabilization lens unit 4), and stores the zoom position Zt and the output value (xt, yt) in the memory 48 (STEP 106). At the telephoto end, the image stabilization lens unit 4 is situated at the reference position after the power-on, and hence x0=xt and y0=yt. Subsequently, the lens CPU 41 drives the zoom lens group 2 to the position at the wide-angle end through the zoom driving circuit 45 (STEP 107). At this time, the zoom position Zn becomes Zw of the wide-angle end. In FIG. 8, the mark center at the wide-angle end deviates from the center of the image taking screen. At this time, the operator operates the zoom operation ring to move the image stabilization lens unit 4 for the position alignment so that the center position of the mark 59 matches the center of the image taking screen. When the operator operates the zoom operation ring 34, the image stabilization lens unit 4 moves in the X direction of FIG. 8, and when the operator operates the zoom operation ring 34 while pressing the direction switch 40, the image stabilization lens unit 4 moves in the Y direction. When the operator presses the preset switch 39 of the zoom operation portion 300 after the position alignment is finished, the position of the image stabilization lens unit 4 in this state is stored. After the lens CPU 41 confirms the input signal of the preset switch 39, the lens CPU 41 reads the zoom position Zw and an output value (xw, yw) of the yaw directional position sensor 24 and the pitch directional position sensor 25, which indicates the position of the image stabilization lens unit 4, and stores the zoom position Zw and the output value (xw, yw) in the memory 48 (STEP 108). Subsequently, the lens CPU 41 calculates a difference (xt−xw, yt−yw) (correction shift amount) between the movement positions (output values) of the image stabilization lens unit 4 at the telephoto end and at the wide-angle end, which are stored in the memory (STEP 109). Then, the lens CPU 41 obtains a correction coefficient k1 (kx1, ky1) based on the difference and a total number Z of sampling points of the zoom position Zn by the following equations (STEP 110).

$$kx1=(xt-xw)/Z \quad (1)$$

$$ky1=(yt-yw)/Z \quad (2)$$

where kx1 and ky1 respectively represent correction coefficients for the X direction and the Y direction. Subsequently, the lens CPU 41 obtains a correction shift amount D1n (Dx1n, Dy1n) of the image stabilization lens unit 4 at the zoom position Zn by the following equations (STEP 111).

$$Dx1n=kx1 \times Zn \quad (3)$$

$$Dy1n=ky1 \times Zn \quad (4)$$

where Dx1n and Dy1n respectively represent movement amounts (correction shift amounts) of the image stabilization lens unit 4 at the zoom position Zn for the X direction and the Y direction. Then, the lens CPU 41 stores, in the memory 48, the obtained correction coefficients kx1 and ky1, and the setting equations of the obtained correction shift amount D1n (Dx1n, Dy1n) (STEP 112). Finally, in response to an input command to turn OFF the correction activating switch 38, the lens CPU 41 returns the allocation of the operation command using the zoom operation ring 34 from the movement of the image stabilization lens unit 4 to the movement of the zoom lens group 2, which is the normal image taking operation (STEP 113).

Hereinafter, referring to a flow chart of FIG. 10, the software processing of the lens CPU 41 serving as the image stabilization controller at the time of normal image taking performed after the correction coefficient k1 (kx1, ky1) and the equations of the correction shift amount D1n (Dx1n, Dy1n) are set for the correction of the positional deviation is described.

Figure 10:
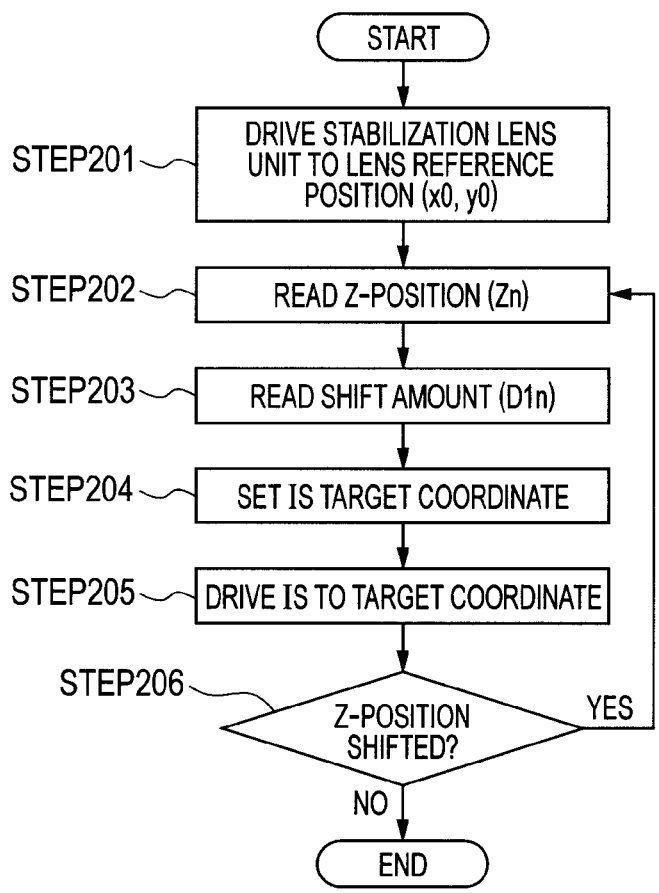
FIG. 10 is a flow chart of processing performed after the correction according to the first embodiment of the present invention.

Referring to FIG. 10, when power is supplied to the lens apparatus 100 and the image pickup apparatus 200, the lens CPU 41 moves the image stabilization lens unit 4 to the reference position (x0, y0) stored in advance in the memory 48, which matches the optical axis O1, through the same operation as in STEP 101 of FIG. 9 (STEP 201). Subsequently, the lens CPU 41 acquires the lens zoom position Zn from the zoom position sensor 12 (STEP 202). Subsequently, the lens CPU 41 reads, from the memory 48, the correction shift amount D1n (Dx1n, Dy1n) at the zoom position Zn (STEP 203). If the correction shift amount D1n (Dx1n, Dy1n) is recorded as a table containing values corresponding to the zoom position Zn, the lens CPU 41 may read the correction shift amount D1n (Dx1n, Dy1n) corresponding to the zoom position Zn. If the correction shift amount D1n (Dx1n, Dy1n) is recorded in the form of equations as a function of the zoom position Zn, the lens CPU 41 may calculate the correction shift amount D1n. Subsequently, the lens CPU 41 sets movement target coordinates of the image stabilization lens unit 4 to be shifted by D1n (Dx1n, Dy1n) (STEP 204). Then, the lens CPU 41 drives the image stabilization lens unit 4 to the target coordinates through the image stabilization lens driving circuit 46 (STEP 205). After that, the operation ends unless the zoom position Zn is shifted by the zoom operation of the operator (STEP 206). When the zoom position is shifted, the lens CPU 41 returns to STEP 202 to acquire zoom position Zn again, and drives the image stabilization lens unit 4 for correction again based on the shift amount D1n at the zoom position Zn.

Through the operation procedures described above, there is produced such an effect of reducing, in the combination of the removable lens apparatus and image pickup apparatus, the movement of the object image at the center of the image taking screen during the zoom operation due to the error in mounting the lens apparatus and the image pickup apparatus (positional deviation of the optical axis). The correction operation is performed with the operation portion usable for image taking, and any mark of the object which allows the center to be determined may be used irrespective of the shape thereof. Accordingly, the correction can be performed easily even in a limited environment such as an image taking location. When any different lens apparatus and image pickup apparatus are connected to each other, the correction operation only needs to be performed at the image taking location at which the combination of the lens apparatus and the image pickup apparatus is used, to thereby obtain a new correction shift amount. Note that, in FIG. 9, the correction coefficient is set by using two magnification-varying positions of the telephoto end and the wide-angle end, but two or more magnification-varying positions may be used. For example, the operation of from STEP 107 to STEP 108 is repeated at the respective positions during zooming, and movement positions of the image stabilization lens unit 4 at the respective positions are stored, which are used to set the correction coefficient. Further, in FIG. 9, the telephoto end, which is high in sensitivity of the positional deviation, is set as the reference position in the correction in consideration of the movement range of the image stabilization lens unit 4 and the reduction in optical performance at the time when the image stabilization lens unit 4 moves to a large extent. However, without the influence of the range and reduction in performance, there is no problem even if another zoom position is set as reference.

Second Embodiment

Hereinafter, referring to an explanatory diagram of FIG. 11 and flow charts of FIGS. 12 and 13, correction of preventing the object image at the center position of the imaging plane from moving depending on the zoom position, and the software processing of the lens CPU 41 in a case where the optical axis position of the lens apparatus deviates during the zoom operation are described.

Figure 12:
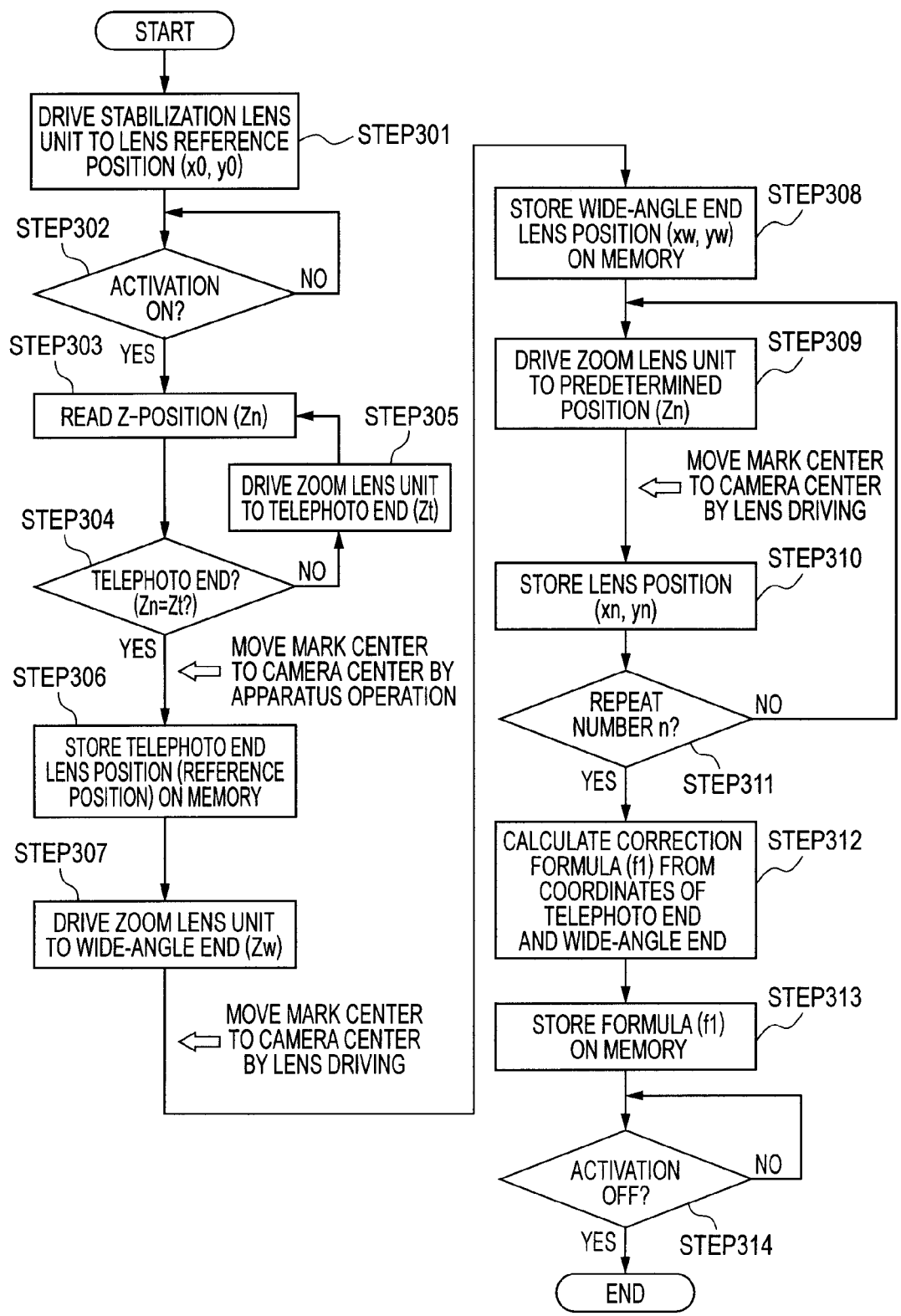
FIG. 12 is a flow chart of correction performed in the case where the positional deviation of the optical axis during zooming of the lens apparatus is present according to a second embodiment of the present invention.

The operation of from STEP 301 to STEP 308 in the flow chart of FIG. 12 for correcting the positional deviation of the optical axis during zooming is the same as the operation of from STEP 101 to STEP 108 in the flow chart of FIG. 9 for correcting the positional deviation of the optical axis due to the error in mounting the lens apparatus and the image pickup apparatus. Specifically, when the correction activating switch 38 is ON, the lens CPU 41 stores the position of the image stabilization lens unit 4 at the telephoto end as the reference position (xt, yt), and after moving the zoom position to the wide-angle end, stores the movement position (xw, yw) of the image stabilization lens unit 4 after the image stabilization lens unit 4 is moved to align the positions of the mark and the camera center. To distinguish from the operation of FIG. 13 described hereinafter, a different operation may be performed in this case for activating the correction. For example, the correction activating switch 38 may be turned ON while pressing the direction switch 40, and this operation only needs to be an operation which is not normally performed by the operator and is identifiable by the lens CPU 41 as different activation of the correction. In this manner, the lens CPU 41 can identify by the activation method whether the operation of FIG. 12 is performed or the operation of FIG. 13 described later, in which the error in mounting the lens apparatus and the image pickup apparatus is corrected, is performed. Further, it is desired that the image pickup apparatus to be used in the correction operation of FIG. 12 is an apparatus for which the optical axis is accurately adjusted with respect to the mount portion 14 of the lens apparatus 100, because only the positional deviation during zooming can be extracted as a correction target.

Figure 11:
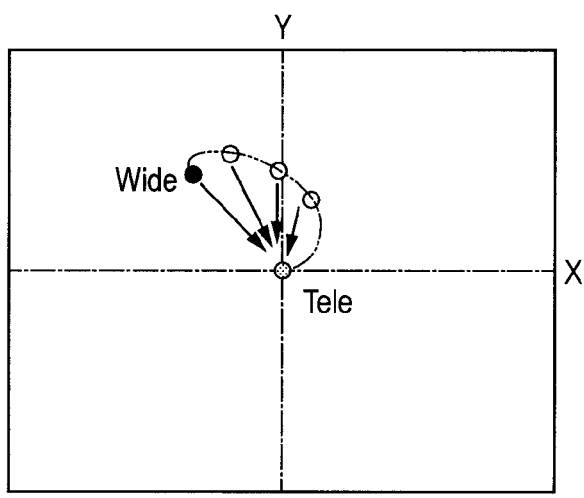
FIG. 11 is a diagram illustrating a locus of the mark center from the telephoto end to the wide-angle end in a case where the positional deviation of the optical axis during zooming of the lens apparatus is present.

As illustrated in FIG. 11, when the zoom position is moved to the wide-angle end after the mark center is aligned with the center of the image taking screen at the telephoto end, the mark deviates and is situated at the position as illustrated in FIG. 11 due to influence of a manufacturing error of the lens apparatus itself or the like. In the case of FIG. 8 where the positional deviation due to the error in mounting the lens apparatus and the image pickup apparatus is present, the positional deviation of the mark occurs forming a substantially linear locus, but in the positional deviation during zooming due to the lens apparatus itself, the locus is not simple in some cases because, for example, an arc locus is formed during zooming as in FIG. 11. This is because the positional deviation occurs at multiple sites in the lens apparatus, for example, in the arrangement of the lenses constituting the lens apparatus or mechanical parts. In view of the above, the positions of during zooming also need to be considered in the case of the positional deviation during zooming due to the lens apparatus itself. Therefore, after the movement position of the image stabilization lens unit 4 at the wide-angle end is stored in STEP 308, the lens CPU 41 drives the zoom lens group 2 to the predetermined zoom position Zn through the zoom driving circuit 45 (STEP 309). At this time, the operator moves the image stabilization lens unit 4 for the position alignment through the same operation as in FIG. 9. Then, when the operator presses the preset switch 39, the position of the image stabilization lens unit 4 in this state is stored. After the lens CPU 41 confirms the input signal of the preset switch 39, the lens CPU 41 acquires a movement position (xn, yn) of the image stabilization lens unit 4 during zooming, and stores the movement position (xn, yn) in the memory 48 (STEP 310). Then, the lens CPU 41 repeats the operation of STEP 309 and STEP 310 while shifting the zoom position, and stores the respective movement positions of the image stabilization lens unit 4. After the lens CPU 41 repeats the operation n times where n represents an integer, the lens CPU 41 proceeds to the next step (STEP 311). Subsequently, the lens CPU 41 reads coordinates of each movement position, and derives an approximate polynomial correction equation $f1(Zn)$ (=$(fx1(Zn), fy1(Zn))$), which represents a curve passing through the telephoto end (xt, yt) and the wide-angle end (xw, yw), and also passing through positions proximate to the coordinates (xn, yn) at each zoom position Zn (STEP 312). The derived correction equation f1 is stored in the memory 48 (STEP 313). Finally, in response to the input command to turn OFF the correction activating switch 38, the lens CPU 41 returns the allocation of the operation command using the zoom operation ring 34 from the movement of the image stabilization lens unit 4 to the movement of the zoom lens group 2, which is the normal image taking operation (STEP 314).

Hereinafter, referring to the flow chart of FIG. 13, the correction operation for the positional deviation of the optical axis due to the error in mounting the image pickup apparatus and the lens apparatus, which has the correction equation f1 for correcting the positional deviation of the optical axis during zooming in the flow chart of FIG. 12, is described.

Figure 13:
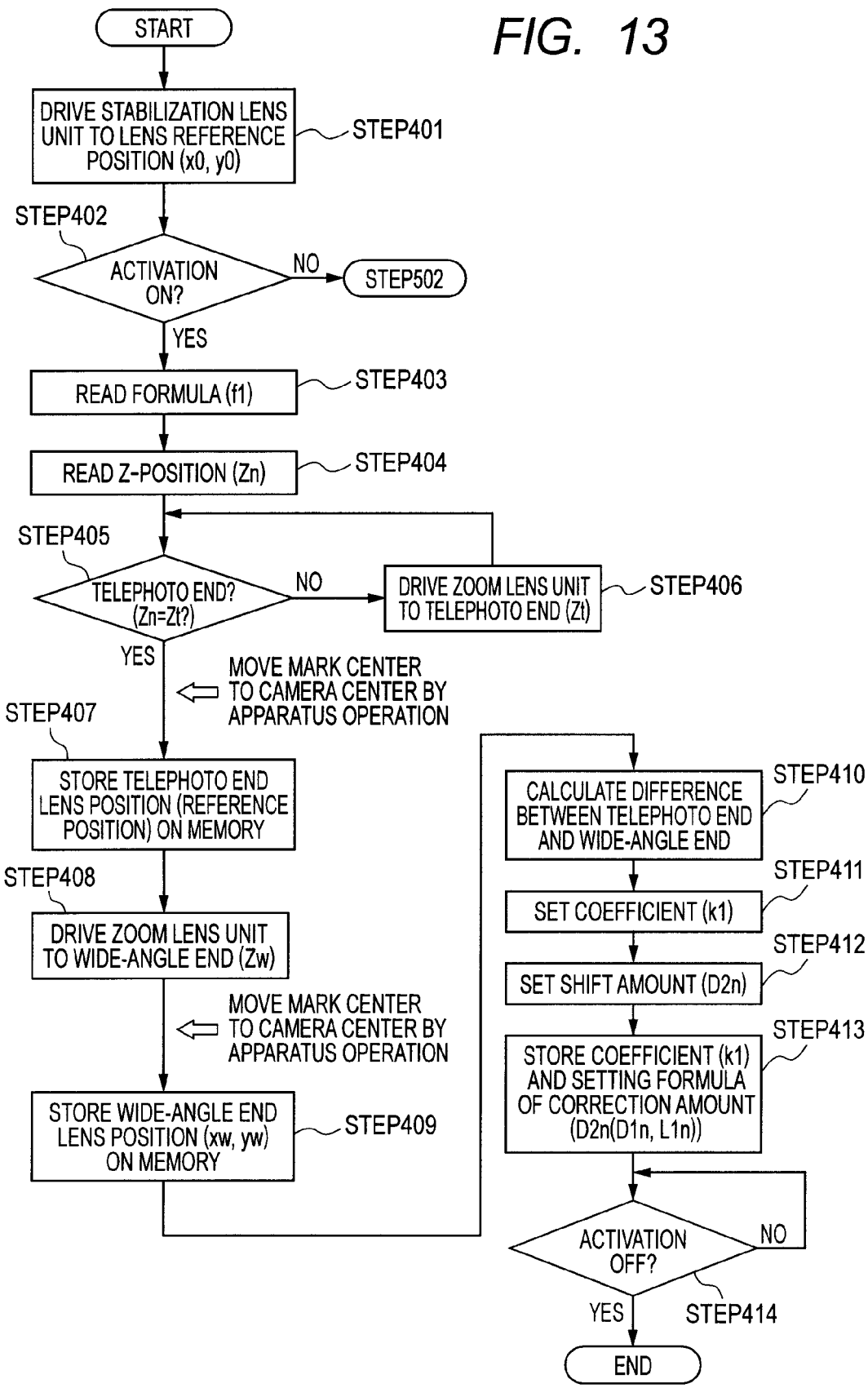
FIG. 13 is a flow chart of correction performed in the case where the positional deviation of the optical axis due to the error in mounting the lens apparatus and the image pickup apparatus is present according to the second embodiment of the present invention.
Figure 14:
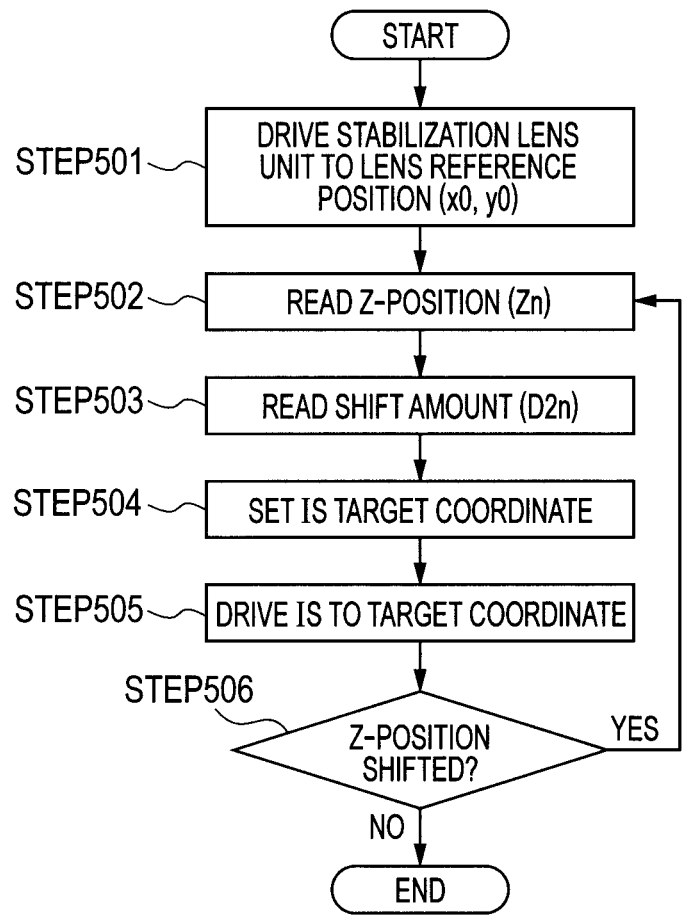
FIG. 14 is a flow chart of processing performed after the correction according to the second embodiment of the present invention.

The operation of from STEP 401 to STEP 411 in the flow chart of FIG. 13 is substantially the same as the operation of from STEP 101 to STEP 110 of FIG. 9. Specifically, when the correction activating switch 38 is ON, the lens CPU 41 stores the position of the image stabilization lens unit 4 at the telephoto end as the reference position (xt, yt) (STEP 407), then moves the zoom to the wide-angle end (STEP 408), and then stores the movement position (xw, yw) of the image stabilization lens unit 4 after the image stabilization lens unit 4 is moved to align the positions of the mark and the center of the image taking screen (STEP 409). If the correction activating switch 38 is OFF, the lens CPU 41 determines that the correction is not performed, and proceeds to an operation mode described later (FIG. 14). Subsequently, the lens CPU 41 calculates the difference (xt−xw, yt−yw) between the movement positions of the image stabilization lens unit 4 at the telephoto end and at the wide-angle end (STEP 410), and obtains the correction coefficients kx1 and ky1 for the X direction and the Y direction based on the difference and the total number Z of sampling points of the zoom position Zn by the following equations (STEP 411).

$$kx1 = (xt - xw)/Z \quad (1)$$

$$ky1 = (yt - yw)/Z \quad (2)$$

By obtaining the correction coefficients, the correction shift amount D1$n$ (Dx1$n$, Dy1$n$) for correcting the positional deviation due to the error in mounting the lens apparatus 100 and the image pickup apparatus 200 is obtained by the following equations.

$$Dx1n = kx1 \times Zn \quad (3)$$

$$Dy1n = ky1 \times Zn \quad (4)$$

The processing of from STEP 401 to STEP 411 of FIG. 13 is different from the processing of from STEP 101 to STEP 110 of FIG. 9 in that the lens CPU 41 reads the correction equation (f1(Zn)=(fx1(Zn), fy1(Zn))) stored in the memory 48 in STEP 403 immediately after the lens CPU 41 confirms the activation of the correction in STEP 402 (STEP 102). Then, in the processing of STEP 404 and subsequent steps of FIG. 13, the lens CPU 41 displaces the image stabilization lens unit 4 by the correction amount corresponding to the zoom positions (telephoto end and wide-angle end) represented by the correction equation f1, and obtains the movement position (xt, yt) of the image stabilization lens unit 4 at the telephoto end and the movement position (xw, yw) of the image stabilization lens unit 4 at the wide-angle end with reference to the position of the image stabilization lens unit 4 after the displacement, which is also the difference between the processing of FIG. 13 and the processing of FIG. 9. In other words, under the state in which the displacement of the optical axis during the zoom operation due to the lens apparatus itself is corrected by the correction equation f1, the correction processing of from STEP 401 to STEP 411 of FIG. 13 is performed, and only the deviation of the optical axis due to the connection between the lens apparatus and the image pickup apparatus is separately set as a correction target.

By the correction equation f1, the lens CPU 41 obtains a correction shift amount L1$n$ (Lx1$n$, Ly1$n$) of the image stabilization lens unit 4 for correcting the positional deviation during zooming of the lens apparatus 100.

$$Lx1n = fx1(Zn) \quad (5)$$

$$Ly1n = fy1(Zn) \quad (6)$$

where Lx1$n$ and Ly1$n$ respectively represent correction shift amounts of the image stabilization lens unit 4 for the X direction and the Y direction, and fx1 and fy1 respectively represent correction formulae for the X direction and the Y direction. Subsequently, by the equations (3) and (4), and the equations (5) and (6), the lens CPU 41 obtains a final correction shift amount D2$n$ (Dx2$n$, Dy2$n$) of the image stabilization lens unit 4 at the zoom position Zn (STEP 412).

$$Dx2n = Lx1n + Dx1n \quad (7)$$

$$Dy2n = Ly1n + Dy1n \quad (8)$$

where Dx2$n$ and Dy2$n$ respectively represent correction shift amounts for the X direction and the Y direction. Then, the lens CPU 41 stores, in the memory 48, the obtained correction coefficient k1 (kx1, ky1), and the setting formulae of the obtained correction shift amounts D1$n$ (Dx1$n$, Dy1$n$) and L1$n$ (Lx1$n$, Ly1$n$) and the final correction shift amount D2$n$ (Dx2$n$, Dy2$n$) (STEP 413). Finally, in response to an input command to turn OFF the correction activating switch 38, the lens CPU 41 returns the operation command using the zoom operation ring 34 from the movement of the image stabilization lens unit 4 to the movement of the zoom lens group 2 (STEP 414).

Hereinafter, referring to a flow chart of FIG. 14, the software processing of the lens CPU 41 serving as the image stabilization controller at the time of normal image taking performed after the correction coefficient k1 (kx1, ky1) and the formulae of the correction shift amounts D1$n$ (Dx1$n$, Dy1$n$) and L1$n$ (Lx1$n$, Ly1$n$) and the final correction shift amount D2$n$ (Dx2$n$, Dy2$n$) are set for the correction of the positional deviation is described.

The operation of STEP 501 and STEP 502 of FIG. 14 is the same as the operation of STEP 201 and STEP 202 of FIG. 10. Specifically, after the lens CPU 41 moves the image stabilization lens unit 4 to the reference position (x0, y0) stored in advance in the memory 48, which matches the optical axis O1, the lens CPU 41 acquires the lens zoom position Zn. Subsequently, the lens CPU 41 reads, from the memory 48, the correction shift amount D2$n$ (Dx2$n$, Dy2$n$) at the zoom position Zn (STEP 503). Subsequently, the lens CPU 41 sets movement target coordinates of the image stabilization lens unit 4 to be shifted by D2$n$ (Dx2$n$, Dy2$n$) (STEP 504). The correction shift amount D2$n$ (Dx2$n$, Dy2$n$) includes the correction shift amount L1$n$ (Lx1$n$, Ly1$n$) of the positional deviation during zooming due to the lens apparatus 100 itself, and the correction shift amount D1$n$ (Dx1$n$, Dy1$n$) of the positional deviation due to the relative positional deviation between the lens apparatus 100 and the image pickup apparatus 200. Hence, movement target coordinates obtained by correcting the respective positional deviations at the zoom position Zn are set. Then, the lens CPU 41 drives the image stabilization lens unit 4 to the target coordinates through the image stabilization lens driving circuit 46 (STEP 505). After that, the operation ends unless the zoom position Zn is shifted by the zoom operation of the operator (STEP 506). When the zoom position is shifted, the lens CPU 41 returns to STEP 502 to acquire Zn again, and drives the image stabilization lens unit 4 for correction again based on the shift amount D2n at the position Zn.

Through the operation procedures described above, in the combination of the removable lens apparatus and image pickup apparatus, the positional deviation of the optical axis during zooming of the lens apparatus, and the positional deviation due to the error in mounting the lens apparatus and the image pickup apparatus can be corrected and reduced. The positional deviation of the optical axis during zooming due to the lens apparatus itself is handled as an inherent characteristic of the lens apparatus.

Thus, when the correction of FIG. 12 with respect to the deviation of the optical axis during zooming is performed at the time of assembling the lens apparatus in a factory, the operator only needs to perform the correction of FIG. 13 at the image taking location. If the correction operations of FIGS. 12 and 13 are to be performed at the same time, the correction equation f1 is calculated in STEP 312 of FIG. 12, and then the value L1n (Lx1n, Ly1n) of each of the equations (5) and (6) obtained in STEP 412 of FIG. 13 is used as the correction shift amount for driving for correction. Note that, without the influence of the movement range of the image stabilization lens unit 4 and the reduction in optical performance, there is no problem even if another zoom position than the telephoto end is set as reference as in the first embodiment.

Third Embodiment

Figure 15:
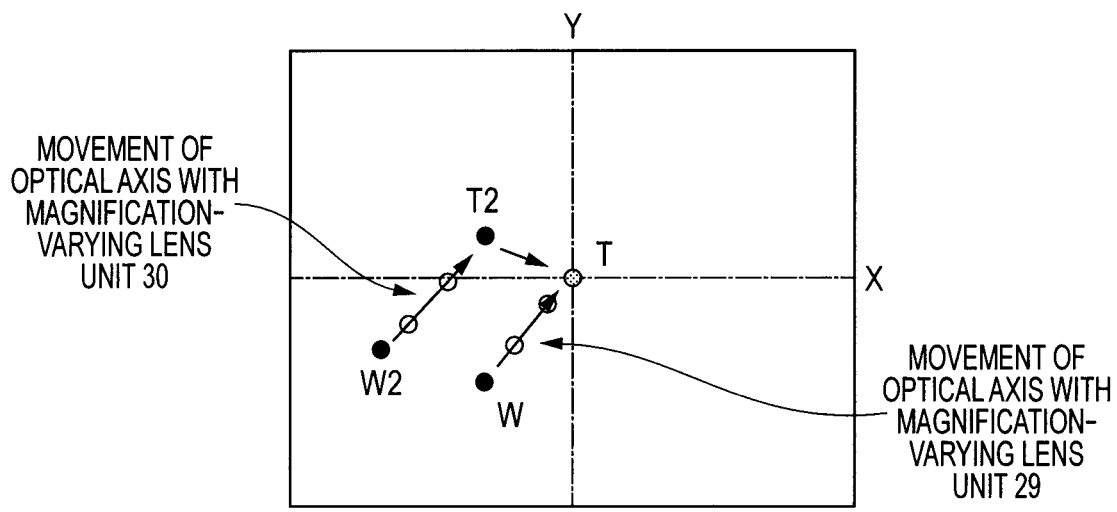
FIG. 15 is a diagram illustrating a locus of the mark center from the telephoto end to the wide-angle end in a case where the positional deviation of the optical axis depending on an optical lens of an optical switching unit to be inserted into an optical path is present.

Hereinafter, referring to an explanatory diagram of FIG. 15 and a flow chart of FIG. 16, the software processing of the lens CPU 41 in a case where the positional deviation of the optical axis due to insertion/removal of each optical lens of the optical switching unit 5 into/from the image taking optical path is present is described. Thereafter, referring to FIG. 17, the correction operation in the case where the positional deviation due to the error in mounting the lens apparatus and the image pickup apparatus is present is described.

Figure 16:
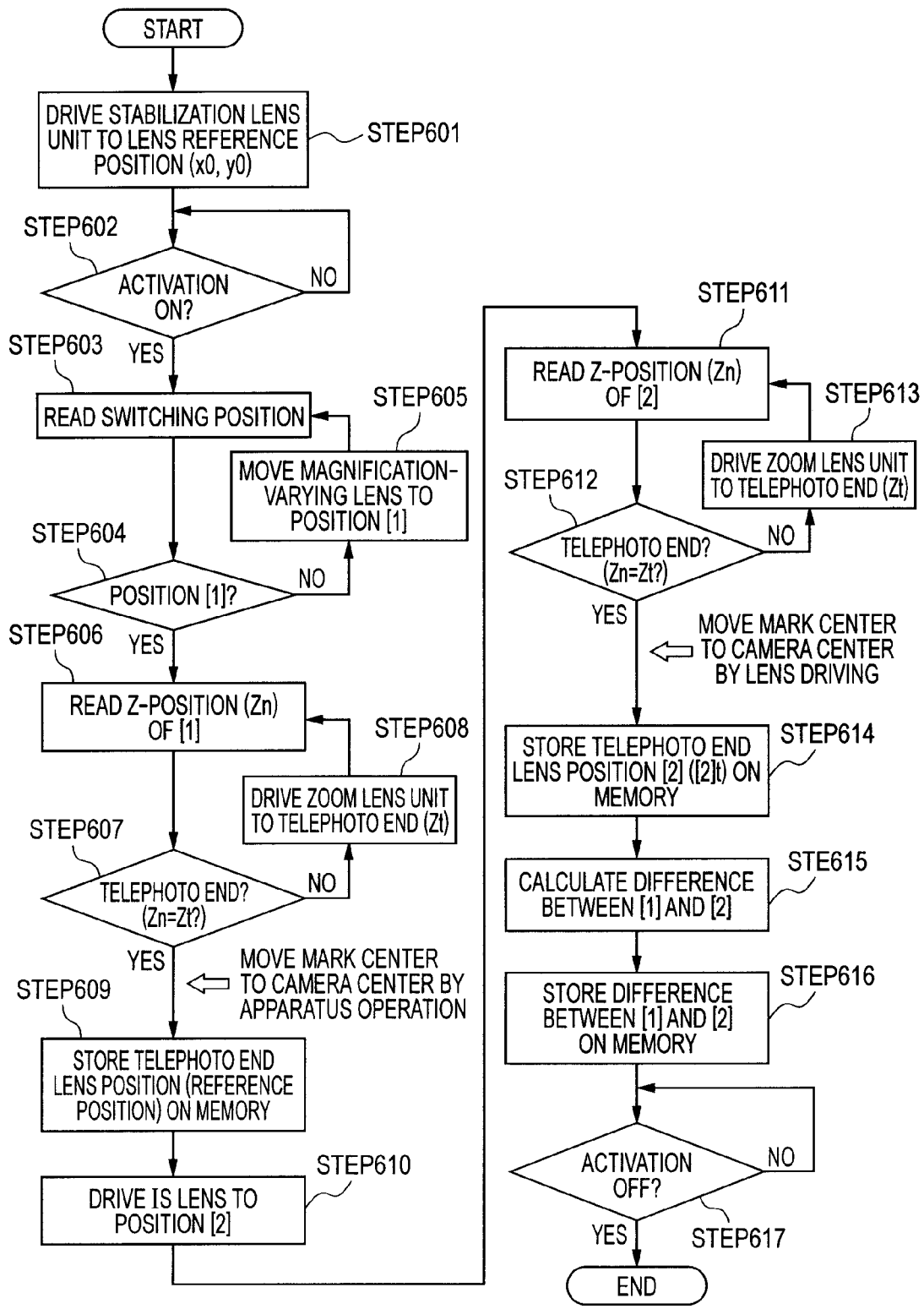
FIG. 16 is a flow chart of correction performed in the case where the positional deviation of the optical axis depending on the optical lens of the optical switching unit to be inserted into the optical path is present according to the third embodiment of the present invention.

The operation of STEP 601 and STEP 602 of FIG. 16 is the same as the operation of STEP 101 and STEP 102 of FIG. 9. Specifically, after the lens CPU 41 moves the image stabilization lens unit 4 to the reference position (x0, y0) stored in advance in the memory 48, which matches the optical axis O1, when the correction activating switch 38 is ON, the lens CPU 41 proceeds to the next step. To distinguish from the operation of FIG. 17 described hereinafter, a different operation may be performed in this case for activating the correction. This operation only needs to be an operation which is not performed by the operator at the time of normal image taking processing and is identifiable by the lens CPU 41 as different activation of the correction. In this manner, the lens CPU 41 can identify by the activation method whether the operation of FIG. 16 is performed or the operation of FIG. 17 described later, in which the error in mounting the lens apparatus and the image pickup apparatus is corrected, is performed. Further, it is desired that the image pickup apparatus to be used in the correction operation of FIG. 16 be an apparatus for which the optical axis is accurately adjusted with respect to the mount portion 14 of the lens apparatus 100, because only the positional deviation due to switching of the optical lens of the optical switching unit can be extracted as a correction target.

In response to an input command to activate the correction, the lens CPU 41 acquires the rotational position of the optical switching unit from the rotational position sensor 33 of the optical switching unit 5. The optical switching unit 5 includes the two optical units different in magnification ratio, that is, the magnification-varying lens unit 29 and the magnification-varying lens unit 30, and hence the lens CPU 41 acquires a rotational position ([1] or [2]) at the time when any one of the lens units is inserted into the image taking optical path (STEP 603). When the value of the rotational position is the value [1] indicating the state in which the magnification-varying lens unit 29 is inserted into the image taking optical path, the lens CPU 41 directly proceeds to the next step, that is, STEP 606 (STEP 604). When the value of the rotational position is not [1], the lens CPU 41 rotates the rotor plate 28 through the switch driving circuit 47 to drive the magnification-varying lens unit 29 so that the magnification-varying lens unit 29 is inserted into the image taking optical path (STEP 605). Then, the lens CPU 41 reads the rotational position again in STEP 603, and after the lens CPU 41 confirms the state of [1] in STEP 604, the lens CPU 41 proceeds to the next step, that is, STEP 606.

Subsequently, the lens CPU 41 acquires the zoom position Zn of the lens from the zoom position sensor 12 (STEP 606). When the value of the zoom position Zn is the value Zt of the telephoto end, the lens CPU 41 directly proceeds to the next step, that is, STEP 609 (STEP 607). When the value of the zoom position Zn is not Zt, the lens CPU 41 drives the zoom lens group 2 to the position at the telephoto end through the zoom driving circuit 45 (STEP 608). Then, the lens CPU 41 reads the zoom position Zn again in STEP 606, and after the lens CPU 41 confirms that Zn=Zt in STEP 607, the lens CPU 41 proceeds to the next step, that is, STEP 609.

At this time, the operator uses the focus operation portion 400 to drive the focus lens unit 1, to thereby perform focusing on the mark 59. Then, the operator operates the operation arm 37 to align the positions of the lens apparatus 100 and the image pickup apparatus 200 (performs the pan/tilt operation, etc.) so that the center position of the mark 59 is situated at the center of the image taking screen. FIG. 15 illustrates a state in which the mark center at the telephoto end matches the center of the image taking screen when the magnification-varying lens unit 29 is inserted into the image taking optical path. At this time, when the operator presses the preset switch 39, the position of the image stabilization lens unit 4 in this state is stored.

After the lens CPU 41 confirms the input signal of the preset switch 39, the lens CPU 41 stores the position of the image stabilization lens unit 4 in this state (STEP 609). At this time, in response to the input command of the preset switch 39, the lens CPU 41 reads the zoom position Zt and the output value (xt, yt) of the yaw directional position sensor 24 and the pitch directional position sensor 25, which indicates the position of the image stabilization lens unit 4, and stores the zoom position Zt and the output value (xt, yt) in the memory 48. At the telephoto end, the image stabilization lens unit 4 is not moved (situated at the reference position), and hence x0=xt and y0=yt.

Subsequently, the lens CPU 41 rotates the rotational plate 28 through the switch driving circuit 47 to drive the magnification-varying lens unit 30 to the insertion position on the image taking optical path (STEP 610). At this time, the value of the rotational position is [2]. In FIG. 15, the mark center in case of [2] deviates from the camera center both on the telephoto side and on the wide-angle side. Subsequently, the lens CPU 41 acquires the lens zoom position Zn in the state of [2] (STEP 611). When the value of the zoom position Zn is the value Zt at the telephoto end, the lens CPU 41 directly proceeds to the next step (STEP 612). When the value of the zoom position Zn is not Zt, the lens CPU 41 drives the zoom lens group 2 to the position at the telephoto end (STEP 613).

Then, the lens CPU 41 reads the zoom position Zn again in STEP 611, and after the lens CPU 41 confirms that Zn=Zt in STEP 612, the lens CPU 41 proceeds to the next step. At this time, the operator operates the zoom operation ring 34 to move the image stabilization lens unit 4 for the position alignment so that the center position of the mark 59 matches the center of the image taking screen. When the operator presses the preset switch 39 after the position alignment, the position of the image stabilization lens unit 4 in this state is stored. After the lens CPU 41 confirms the input signal of the preset switch 39, the lens CPU 41 stores a movement position ([2]xt, [2]yt) of the image stabilization lens unit 4 in the state of [2] (STEP 614).

Subsequently, the lens CPU 41 calculates a difference (xt−[2]xt, yt−[2]yt) between the output value at the telephoto end in the state of [1] and the output value at the telephoto end in the state of [2], which are stored in the memory 48 (STEP 615). Then, the lens CPU 41 stores the difference in the memory 48 (STEP 616). Finally, the operator turns OFF the correction activating switch 38 to finish the correction mode (STEP 617). Finally, in response to the input command to turn OFF the correction activating switch 38, the lens CPU 41 returns the allocation of the operation command using the zoom operation ring 34 from the movement of the image stabilization lens unit 4 to the movement of the zoom lens group 2, which is the normal image taking operation.

Hereinafter, referring to a flow chart of FIG. 17, the operation of correcting the positional deviation due to the error in mounting the lens apparatus 100 and the image pickup apparatus 200 when the optical switching unit 5 is in the state of [2] after the correction operation of FIG. 16 is performed is described. Note that, the operation of correcting the positional deviation when the optical switching unit 5 is in the state of [1] is the same as the operation of FIG. 9, and description thereof is therefore omitted herein.

Figure 17:
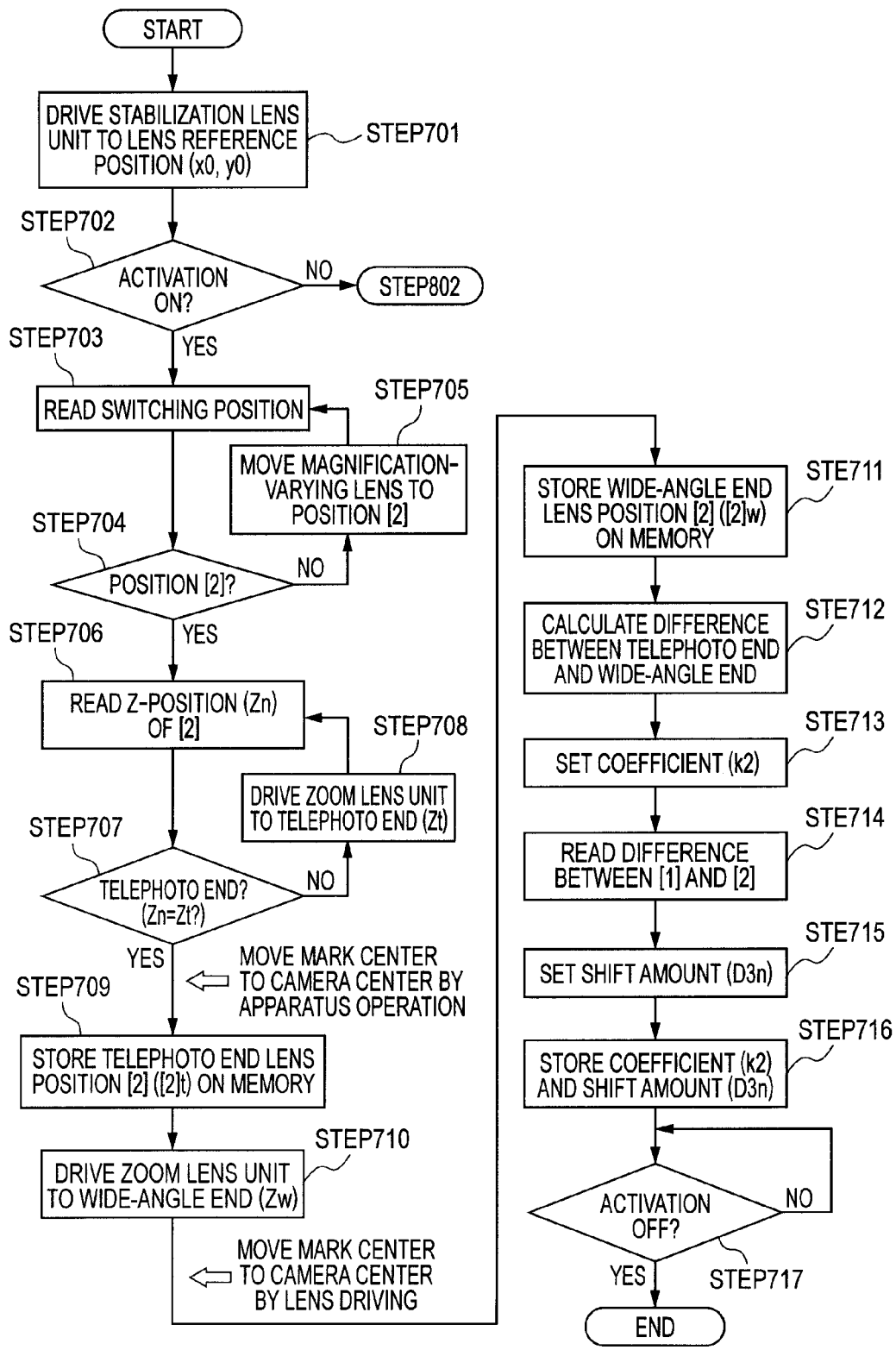
FIG. 17 is a flow chart of correction performed in the case where the positional deviation of the optical axis due to the error in mounting the lens apparatus and the image pickup apparatus is present according to the third embodiment of the present invention.

The operation of from STEP 701 to STEP 703 of FIG. 17 is the same as the operation of from STEP 601 to STEP 603 of FIG. 16. Specifically, after the lens CPU 41 moves the image stabilization lens unit 4 to the reference position (x0, y0) stored in advance in the memory 48, which matches the optical axis O1, when the correction activating switch 38 is ON, the lens CPU 41 acquires the rotational position of the optical switching unit. When the value of the rotational position is [2], the lens CPU 41 directly proceeds to the next step (STEP 704). When the value of the rotational position is not [2], the lens CPU 41 rotates the rotational plate 28 through the switch driving circuit 47 to drive the magnification-varying lens unit 30 so that the magnification-varying lens unit 30 is inserted into the image taking optical path (STEP 705). Then, the lens CPU reads the rotational position again in STEP 703, and after the lens CPU 41 confirms the state of [2] in STEP 704, the lens CPU 41 proceeds to the next step. The subsequent operation of from STEP 706 to STEP 712 is the same as the operation of from STEP 103 to STEP 109 of FIG. 9, except that the optical switching unit 5 is switched to the state of [2]. Specifically, in the state of [2], the lens CPU 41 moves the zoom position to the telephoto end Zt, and after the lens apparatus and the image pickup apparatus are operated to align the positions of the mark center and the center of the image taking screen, stores the position ([2]xt, [2]yt) of the image stabilization lens unit 4 at the telephoto end. Then, the lens CPU 41 moves the zoom position to the wide-angle end Zw, and stores a position ([2]xw, [2]yw) of the image stabilization lens unit 4 after the image stabilization lens unit 4 is moved to align the positions of the mark center and the center of the image taking screen. After that, the lens CPU 41 calculates a difference ([2]xt−[2]xw, [2]yt−[2]yw) between the output values at the telephoto end and at the wide-angle end, which are stored in the memory 48. Subsequently, the lens CPU 41 obtains a correction coefficient k2 at the center position in the state of [2] based on the difference and the total number Z of sampling points of the zoom position Zn by the following equations (STEP 713).

$$kx2 = ([2]xt - [2]xw)/Z \tag{9}$$

$$ky2 = ([2]yt - [2]yw)/Z \tag{10}$$

where kx2 and ky2 respectively represent correction coefficients for the X direction and the Y direction.

Subsequently, the lens CPU 41 reads, from the memory 48, the difference (xt−[2]xt, yt−[2]yt) between the states of [1] and [2], which is calculated in FIG. 16 (STEP 714). Then, by the equations (9) and (10), and the difference, the lens CPU 41 obtains a correction shift amount D3n of the image stabilization lens unit 4 at the zoom position Zn in the state of [2] (STEP 715).

$$Dx3n = kx2 \times Zn + (xt - [2]xt) \tag{11}$$

$$Dy3n = ky2 \times Zn + (yt - [2]yt) \tag{12}$$

where Dx3n and Dy3n respectively represent correction shift amounts for the X direction and the Y direction. Then, the lens CPU 41 stores, in the memory 48, the obtained correction coefficient k2 (kx2, ky2), and the setting formulae of the obtained correction shift amount D3n (Dx3n, Dy3n) (STEP 716). Finally, in response to the input command to turn OFF the correction activating switch 38, the lens CPU 41 returns the allocation of the operation command using the zoom operation ring 34 from the movement of the image stabilization lens unit 4 to the movement of the zoom lens group 2, which is the normal image taking operation (STEP 717).

Hereinafter, referring to a flow chart of FIG. 18, the software processing of the lens CPU 41 serving as the image stabilization controller at the time of normal image taking performed after the correction of the positional deviation is described.

Figure 18:
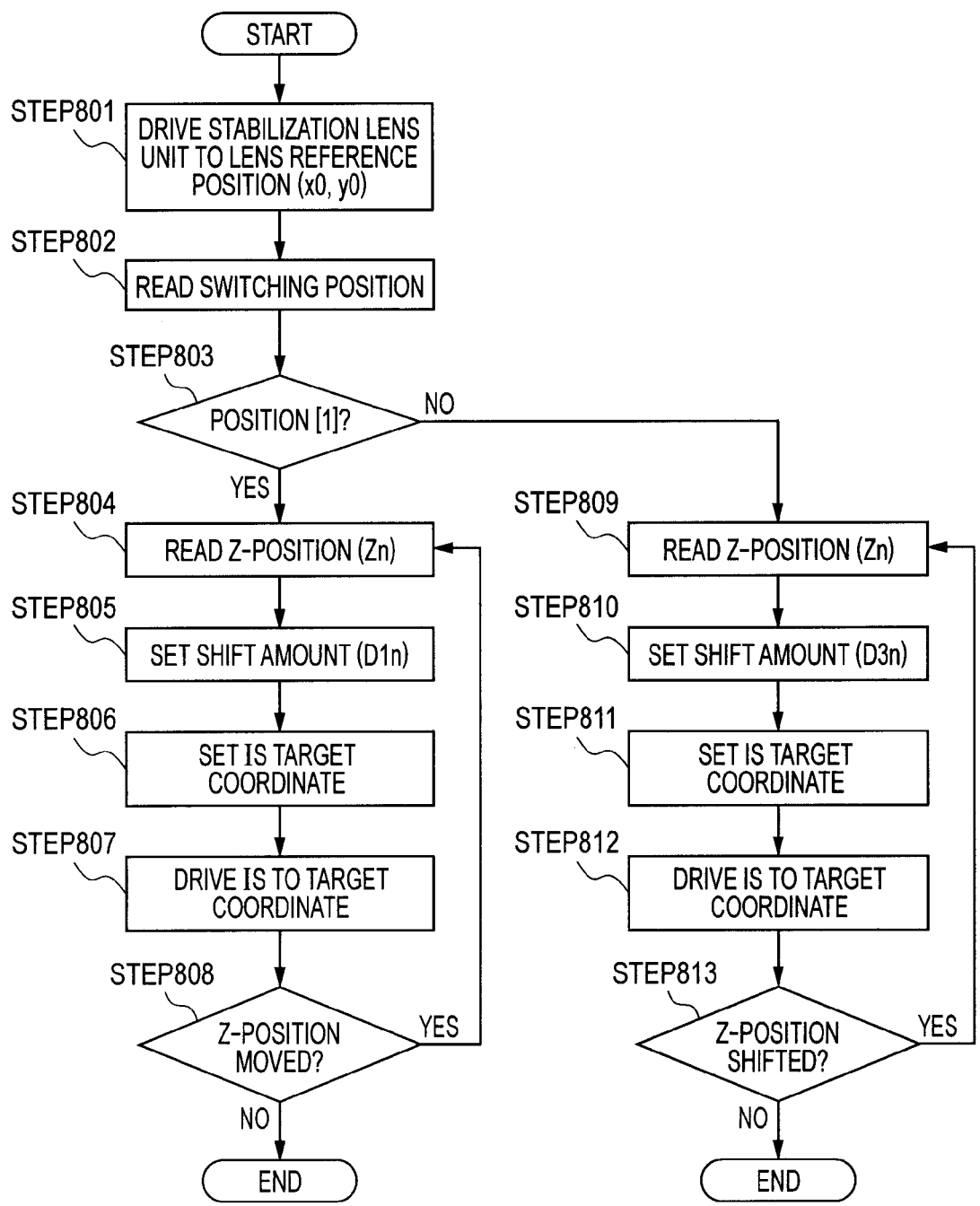
FIG. 18 is a flow chart of processing performed after the correction according to the third embodiment of the present invention.

Referring to FIG. 18, when power is supplied to the lens apparatus 100 and the image pickup apparatus 200, the lens CPU 41 moves the image stabilization lens unit 4 to the reference position (x0, y0) stored in advance in the memory 48, which matches the optical axis O1, as in STEP 101 of FIG. 9 (STEP 801). Subsequently, the lens CPU 41 acquires the rotational position [1] or [2] in order to determine which of the magnification-varying lens unit 29 and the magnification-varying lens unit 30 of the optical switching unit 5 is inserted into the image taking optical path (STEP 802). When the value of the rotational position is the value [1] indicating the state in which the magnification-varying lens unit 29 is inserted into the image taking optical path, the lens CPU 41 directly proceeds to the next step (STEP 803). When the value of the rotational position is not [1], the lens CPU 41 proceeds to a step for the value [2]. The operation of from STEP 804 to STEP 808 for the value [1] is the same as the operation of from STEP 202 to STEP 206 of FIG. 10. Specifically, after the lens CPU 41 acquires the zoom position Zn, the lens CPU 41 reads the correction shift amount D1n, and sets the movement target coordinates of the image stabilization lens unit 4 to be shifted by D1n. Then, the lens CPU 41 drives the image stabilization lens unit 4 to the target coordinates. Then, the operation ends unless the zoom position Zn is shifted. When the zoom position is shifted, the lens CPU 41 acquires Zn again, and drives the image stabilization lens unit 4 for correction based on the shift amount D1n at the position Zn. When the optical switching unit 5 is not in the state of [1] in STEP 803, the lens CPU 41 acquires the zoom position Zn in the state of [2] (STEP 809). Then, the lens CPU 41 reads, from the memory 48, the correction shift amount D3n (Dx3n, Dy3n) for correcting the positional deviation due to the switching between [1] and [2], and the positional deviation due to the error in mounting the lens apparatus 100 and the image pickup apparatus 200 in the state of [2] (STEP 810). Subsequently, the lens CPU 41 sets the movement target coordinates of the image stabilization lens unit 4 to be shifted by D3n (Dx3n, Dy3n) (STEP 811). Then, the lens CPU 41 drives the image stabilization lens unit 4 to the target coordinates through the image stabilization lens driving circuit 46 (STEP 812). After that, the operation ends unless the zoom position Zn is shifted by the zoom operation of the operator (STEP 813). When the zoom position is shifted, the lens CPU 41 returns to STEP 809 to acquire Zn again, and drives the image stabilization lens unit 4 for correction again based on the shift amount D3n (Dx3n, Dy3n) at the position Zn.

Through the operation procedures described above, in the combination of the removable lens apparatus and image pickup apparatus, the positional deviation of the optical axis of the optical switching unit of the lens apparatus, and the positional deviation due to the error in mounting the lens apparatus and the image pickup apparatus can be corrected and reduced. The positional deviation of the optical axis due to the insertion/removal of the magnification-varying lens unit is handled as an inherent characteristic of the lens, and is attributed to the lens apparatus itself. Thus, for example, when the correction of FIG. 16 with respect to the positional deviation of the optical axis due to the insertion/removal of the magnification-varying lens unit is performed at the time of assembling the lens apparatus in the factory, the operator only needs to perform the correction of FIG. 17 at the image taking location. By the way, in FIGS. 16 and 17, the correction is performed depending on the two lens units different in magnification ratio, but if the optical switching unit switches the magnification ratio by insertion/removal of a single magnification-varying lens, the correction operation is performed depending on whether or not the magnification-varying lens is inserted. Note that, without the influence of the movement range of the image stabilization lens unit 4 and the reduction in optical performance, there is no problem even if another zoom position than the telephoto end is set as reference as in the first embodiment.

Fourth Embodiment

Hereinafter, referring to an explanatory diagram of FIG. 19 and flow charts of FIGS. 20 and 21, the correction operation and the software processing of the lens CPU 41 in a case where the positional deviation of the optical axis during zooming due to the lens apparatus itself, and the positional deviation of the optical axis due to the insertion of each optical lens of the optical switching unit into the image taking optical path are present are described.

Figure 20:
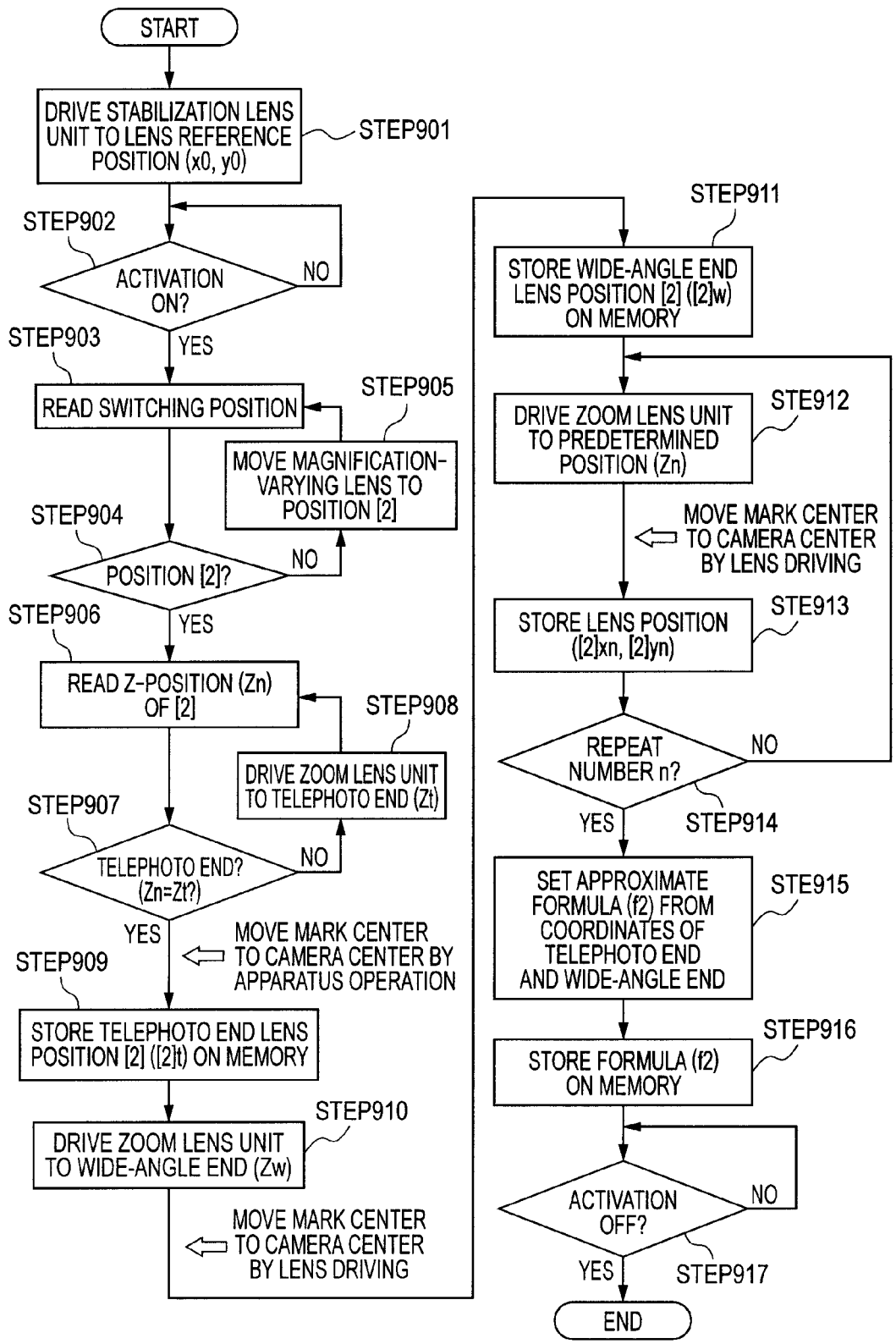
FIG. 20 is a flow chart of correction performed in the case where the positional deviation of the optical axis during zooming is present when the optical lens of the optical switching unit of the lens apparatus is switched according to the fourth embodiment of the present invention.

First, referring to FIG. 20, the flow chart for correcting the positional deviation of the optical axis during zooming when the optical lens of the optical switching unit 5 is switched to the state of [2] is described. Note that, the operation of correcting the positional deviation during zooming when the optical lens of the optical switching unit 5 is in the state of [1] is the same as the operation of FIG. 12, and description thereof is therefore omitted herein.

The operation of from STEP 901 to STEP 911 of FIG. 20 is the same as the operation of from STEP 701 to STEP 711 of FIG. 17. Specifically, when the correction activating switch 38 is ON, in the state of [2], the lens CPU 41 stores the position of the image stabilization lens unit 4 at the telephoto end as the reference position ([2]xt, [2]yt). Then, the lens CPU 41 switches the zoom position to the wide-angle end, and stores the movement position ([2]xw, [2]yw) of the image stabilization lens unit 4 at the wide-angle end. To distinguish from the operation of FIG. 21 described hereinafter, a different operation may be performed in this case for activating the correction. This operation only needs to be an operation which is not normally performed by the operator and is identifiable by the lens CPU 41 as different activation of the correction. In this manner, the lens CPU 41 can identify by the activation method whether the operation of FIG. 20 is performed or the operation of FIG. 21 described later, in which the error in mounting the lens apparatus and the image pickup apparatus is corrected, is performed. Further, it is desired that the image pickup apparatus to be used in the correction operation of FIG. 20 be an apparatus for which the optical axis is accurately adjusted with respect to the mount portion 14 of the lens apparatus 100, because only the positional deviation during zooming can be extracted as a correction target.

Figure 19:
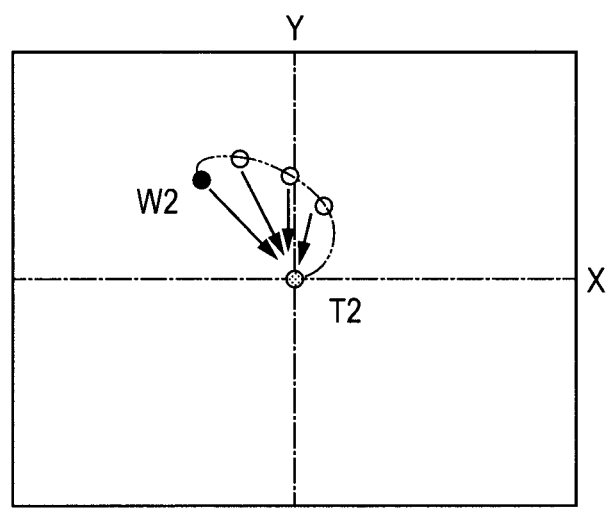
FIG. 19 is a diagram illustrating a locus of the mark center from the telephoto end to the wide-angle end in the case where the positional deviation of the optical axis during zooming of the lens apparatus is present and in the case where the positional deviation of the optical axis depending on the optical lens of the optical switching unit to be inserted into the optical path is present.

In FIG. 19, when the zoom position is moved to the wide-angle end after the mark center is aligned with the center of the image taking screen at the telephoto end, the mark deviates and is situated at the position as illustrated in FIG. 19 at the wide-angle end in the case where the deviation of the optical axis during zooming is present in the lens apparatus itself. The subsequent operation of from STEP 912 to STEP 917 is the same as the operation of from STEP 309 to STEP 314 of FIG. 12 in the state of [2]. Specifically, in the state of [2], the lens CPU 41 moves the image stabilization lens unit 4 at the predetermined zoom position Zn, and in response to the input signal of the preset switch 39, stores the movement position after the position alignment. After the lens CPU repeats the operation n times where n represents an integer, the lens CPU 41 reads the coordinates of each movement position, and derives an approximate polynomial correction formula f2, which represents a curve passing through the telephoto end ([2]xt, [2]yt) and the wide-angle end ([2]xw, [2]yw), and also passing through positions proximate to coordinates ([2]xn, [2]yn) at each zoom position in the state of [2]. The derived correction formula is stored in the memory 48. Finally, in response to the input command to turn OFF the correction activating switch 38, the lens CPU 41 returns the allocation of the operation command using the zoom operation ring 34 from the movement of the image stabilization lens unit 4 to the movement of the zoom lens group 2, which is the normal image taking operation.

Subsequently, the lens CPU 41 performs the correction operation of acquiring the difference in the positional deviation between the states of [1] and [2] when the optical lens of the optical switching unit 5 is switched to the state of [2], but the operation is the same as that of FIG. 16, and description thereof is therefore omitted herein.

Figure 21:
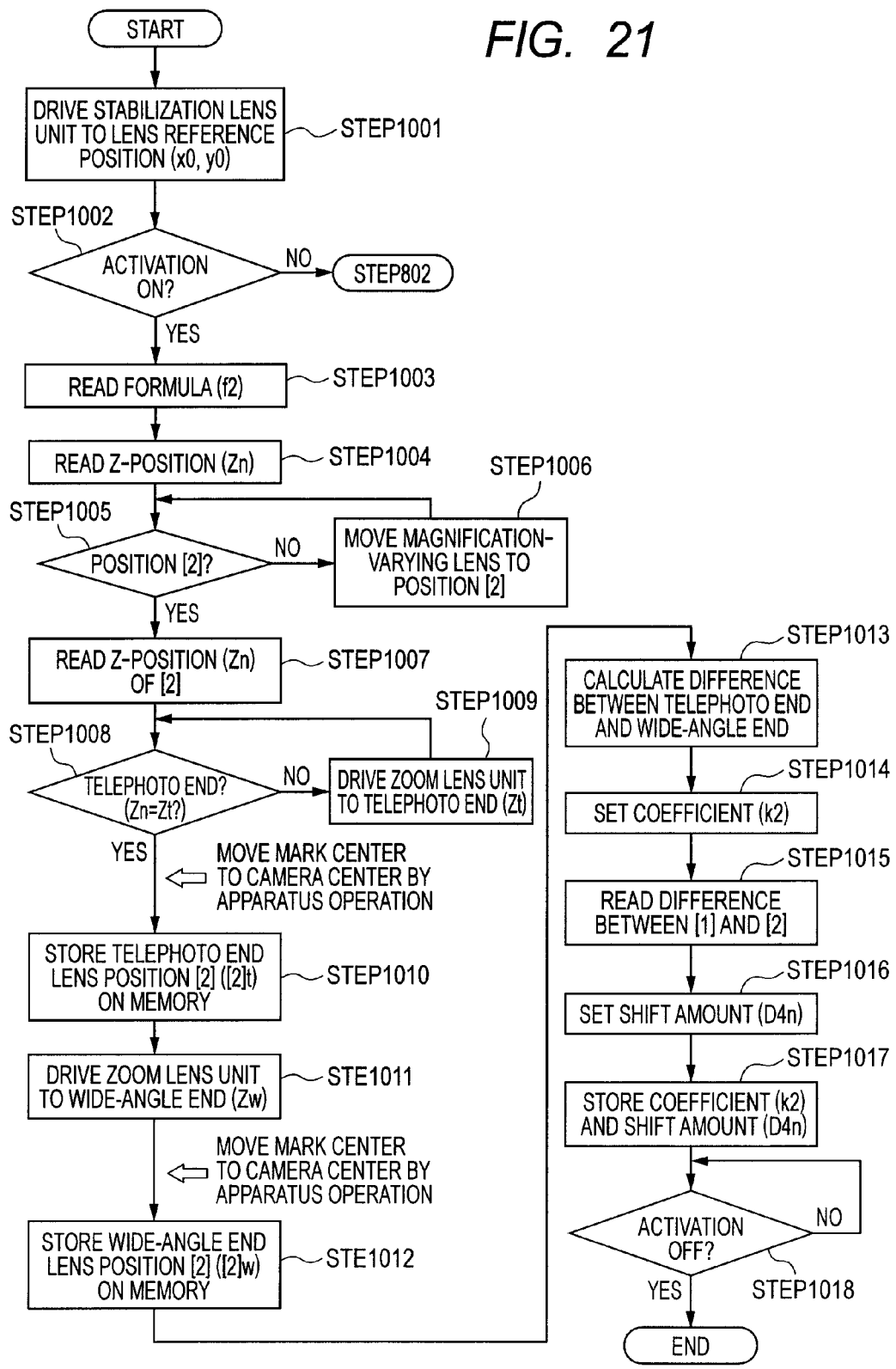
FIG. 21 is a flow chart of correction performed in the case where the positional deviation of the optical axis due to the error in mounting the lens apparatus and the image pickup apparatus is present when the optical lens of the optical switching unit of the lens apparatus is switched according to the fourth embodiment of the present invention.

To distinguish from the correction flows of FIGS. 20 and 21, a different operation from those of FIGS. 20 and 21 may be performed for activating the correction. This operation only needs to be an operation which is not normally performed by the operator. As in the case of FIG. 16, it is desired that the image pickup apparatus to be used in this case be an apparatus for which the optical axis is accurately adjusted with respect to the mount portion 14 of the lens apparatus 100, because only the positional deviation due to the switching of the optical lens of the optical switching unit can be extracted as a correction target.

Hereinafter, referring to the flow chart of FIG. 21, the operation of correcting the positional deviation of the optical axis due to the error in mounting the lens apparatus 100 and the image pickup apparatus 200 when the optical lens of the optical switching unit 5 is in the state of [2] after the correction operations of FIGS. 20 and 16 are performed is described. Note that, the operation of correcting the positional deviation when the optical lens of the optical switching unit 5 is in the state of [1] is the same as the operation of FIG. 13, and description thereof is therefore omitted herein.

The operation of from STEP 1001 to STEP 1014 of FIG. 21 is substantially the same as the operation of from STEP 701 to STEP 713 of FIG. 17. Specifically, when the correction activating switch 38 is ON, in the state of [2] of the optical lens of the optical switching unit 5, the lens CPU 41 stores the position of the image stabilization lens unit 4 at the telephoto end as the reference position ([2]xt, [2]yt). Then, after moving the zoom position to the wide-angle end (STEP 1011), the lens CPU 41 stores the movement position ([2]xw, [2]yw) of the image stabilization lens unit 4 after the image stabilization lens unit 4 is moved to align the mark and the center of the image taking screen (STEP 1012). After that, the lens CPU 41 calculates the difference ([2]xt−[2]xw, [2]yt−[2]yw) between the movement positions of the image stabilization lens unit 4 at the telephoto end and at the wide-angle end, which are stored in the memory 48 (STEP 1013), and obtains the correction coefficients k2 (kx2, ky2) at the center position in the state of [2] of the optical lens of the optical switching unit 5 based on the difference and the total number Z of sampling points of the zoom position Zn by the equations (9) and (10) as in FIG. 17 (STEP 1014).

Then, the lens CPU 41 reads, from the memory 48, the difference (xt−[2]xt, yt−[2]yt) between the states of [1] and [2], which is calculated in the correction operation of FIG. 16 (STEP 1015). Subsequently, by the equations (9) and (10), and the difference, the lens CPU 41 obtains the correction shift amount D3n (Dx3n, Dy3n) of the image stabilization lens unit 4 at the zoom position Zn in the state of [2] as represented in the equations (11) and (12).

The processing of from STEP 1001 to STEP 1014 of FIG. 21 is different from the processing of from STEP 701 to STEP 713 of FIG. 17 in that the lens CPU 41 reads the correction equation (f2(Zn)=(fx2(Zn), fy2(Zn))) stored in the memory 48 in STEP 1003 immediately after the lens CPU 41 confirms the activation of the correction in STEP 1002 (STEP 702). Then, in the processing of STEP 1004 and subsequent steps of FIG. 21, the lens CPU 41 displaces the image stabilization lens unit 4 by the correction amount corresponding to the zoom positions (telephoto end and wide-angle end) represented by the correction formula f2, and obtains the movement position [2](xt, yt) of the image stabilization lens unit 4 at the telephoto end and the movement position [2](xw, yw) of the image stabilization lens unit 4 at the wide-angle end with reference to the position of the image stabilization lens unit 4 after the displacement, which is also the difference between the processing of FIG. 21 and the processing of FIG. 17.

By the correction formula f2, the lens CPU 41 obtains a correction shift amount L2n (Lx2n, Ly2n) of the image stabilization lens unit 4 for correcting the positional deviation during zooming of the lens apparatus 100.

$$Lx2n = fx2(Zn) \tag{13}$$

$$Ly2n = fy2(Zn) \tag{14}$$

where Lx2n and Ly2n respectively represent correction shift amounts for the X direction and the Y direction, and fx2 and fy2 respectively represent correction formulae for the X direction and the Y direction. Subsequently, by the equations (11) and (12), and the equations (13) and (14), the lens CPU 41 obtains a final correction shift amount D4n (Dx4n, Dy4n) of the image stabilization lens unit 4 at the zoom position Zn (STEP 1016).

$$Dx4n = Lx2n + Dx3n \tag{15}$$

$$Dy4n = Ly2n + Dy3n \tag{16}$$

where Dx4n and Dy4n respectively represent correction shift amounts for the X direction and the Y direction. Then, the lens CPU 41 stores, in the memory 48, the obtained correction coefficients k2, and the setting equations of the obtained correction shift amounts Dx3n and Dy3n, and Lx2n and Ly2n, and the final correction shift amounts Dx4n and Dy4n (STEP 1017). Finally, in response to an input command to turn OFF the correction activating switch 38, the lens CPU 41 returns the allocation of the operation command using the zoom operation ring 34 from the movement of the image stabilization lens unit 4 to the movement of the zoom lens group 2, which is the normal image taking operation (STEP 1018).

Regarding the software processing of the lens CPU performed after the correction of the positional deviation of FIGS. 20, 21 and 16, the same operation can be performed when the correction shift amount to be read in STEP 810 in the flow chart of FIG. 18 is replaced with D4n. Therefore, detailed description thereof is omitted herein.

Through the operation procedures described above, in the combination of the removable lens apparatus and image pickup apparatus, the positional deviation of the optical axis during zooming of the lens apparatus at the time of switching the optical switching unit, and the positional deviation due to the error in mounting the image pickup apparatus can be adjusted and reduced. The respective correction operations are performed separately, and thus, for example, when the correction of FIGS. 20 and 16 is performed at the time of assembling the lens apparatus in the factory, the operator only needs to perform the correction of FIG. 21 at the image taking location. Note that, without the influence of the movement range of the image stabilization lens unit 4 and the reduction in optical performance, there is no problem even if another zoom position than the telephoto end is set as reference as in the first embodiment.

Fifth Embodiment

Hereinafter, a case where the lens apparatus and the image pickup apparatus are connected to each other in multiple combinations is described. FIG. 22 is a schematic view of a case where the lens apparatus is connected to one of multiple image pickup apparatuses. A lens apparatus 500 and an image pickup apparatus a 600 are connected to each other through a mount portion 60 mounting/removing the lens apparatus and the image pickup apparatus. If the same connection method is employed in the lens apparatus and the image pickup apparatus, the combination thereof may be changed. Accordingly, the lens apparatus 500 may be connected to another image pickup apparatus b 700 that employs the same connection method. When connected to the image pickup apparatus a 600, the lens apparatus 500 of FIG. 22 is mounted onto an apparatus base 800 together with the image pickup apparatus a 600, and is operated, at the time of taking images in this state, by using operation portions 900 respectively fixed to the vicinity of distal ends of operation arms of the apparatus base 800. When the lens apparatus 500 is connected to the image pickup apparatus b 700, the lens apparatus 500 is separated from the image pickup apparatus a 600 and the apparatus base 800, and the operator (not shown) takes images while shouldering the lens apparatus 500. When taking images, the operator operates an operation ring (not shown) provided to an outer periphery of the lens apparatus 500. The lens apparatus 500 has the same internal configuration as the lens apparatus 100 of FIG. 1, and includes the function and software for correcting the positional deviation of the optical axis due to the error in mounting the lens apparatus and the image pickup apparatus described in the first to fourth embodiments. Further, the operation portions 900 include an operation member to be used for correcting the positional deviation similarly to the zoom operation portion 300 of FIGS. 4A and 4B. Further, the lens apparatus 500, the image pickup apparatus a 600, and the image pickup apparatus b 700 each include a communication unit that allows, when the lens apparatus and one of the image pickup apparatuses are connected to each other, internal CPUs (not shown) thereof to perform information transmission through a communication link such as serial communication, to thereby transmit and receive request commands and information. In consideration of the case where the lens apparatus 500 is connected to one of the multiple image pickup apparatuses, the lens apparatus 500 stores multiple correction formulae for the positional deviation corresponding to the image pickup apparatus to be connected to the lens apparatus 500 in an internal memory (not shown) serving as a camera information storing unit. The respective correction formulae are stored through the correction operations described in the first to fourth embodiments when each image pickup apparatus and the lens apparatus 500 are connected to each other. When storing the correction formulae through the correction operations, an identification number serving as identification information described later is received from the image pickup apparatus, or the camera number input unit 49 of FIG. 5 is used to input the identification number. Accordingly, the image pickup apparatus currently connected to the lens apparatus 500 is identified.

FIG. 23 is a list of the correction formulae of the respective image pickup apparatuses stored in the internal memory of the lens apparatus 500. When the lens apparatus 500 is connected to the image pickup apparatus a 600, the internal CPU of the lens apparatus 500 selects a correction formula D(a), and when the lens apparatus 500 is connected to the image pickup apparatus b 700, selects a correction formula D(b). Also when the lens apparatus 500 is connected to one of the other image pickup apparatuses, the internal CPU selects a correction formula depending on the connection to the image pickup apparatus.

Hereinafter, referring to FIG. 24, a flow chart of selecting the correction formula is described.

First, in order to identify the image pickup apparatus currently connected to the lens apparatus 500, the internal CPU of the lens apparatus 500 transmits a command to request a camera identification signal to the internal CPU of the image pickup apparatus through a serial port serving as the camera information inputting unit (STEP 1101). When receiving the command, the internal CPU of the image pickup apparatus transmits the camera identification signal to the internal CPU of the lens apparatus 500 through the serial port, and the identification number is read on the lens apparatus 500 side (STEP 1102). Then, the internal CPU of the lens apparatus 500 identifies the image pickup apparatus based on the identification number, and selects the correction formula of the image pickup apparatus that is identified from the list of FIG. 23 (STEP 1103). The selected correction formula is used for the correction operation of each of the first to fourth embodiments.

Through the operation procedures described above, even if the lens apparatus and the image pickup apparatus are removable and hence the combination thereof cannot be specified, by storing the correction formulae for the respective image pickup apparatuses in advance, the correction can be performed depending on each combination of the lens apparatus and the image pickup apparatus. Note that, in FIG. 24, the identification number of the image pickup apparatus is acquired from the image pickup apparatus, but if the communication unit therefor is not provided, the camera number input unit 49 of FIG. 5 is used to input the identification number, and the correction formula corresponding to the input number is selected from the list of FIG. 23.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-168191, filed Jul. 27, 2010, which is hereby incorporated by reference herein in its entirety.

What is claimed is:

1. A lens apparatus comprising:
a magnification-varying lens unit configured to move in an optical axis direction during varying magnification;
an image stabilization lens unit configured to move in a direction perpendicular to an optical axis;
an image stabilization driving unit configured to drive the image stabilization lens unit;
a storage unit that stores a correction shift amount, which is a movement amount for driving the image stabilization lens unit to reduce a positional deviation of an object image formed at one predetermined point on an image plane, the positional deviation being caused by a movement of the magnification-varying lens unit, and the correction shift amount being obtained by detecting at least two magnification-varying positions;
a camera information inputting unit configured to input identification information of an image pickup apparatus to be connected;
a camera information storing unit that stores the identification information input by the camera information inputting unit and the correction shift amount of the image stabilization lens unit corresponding to the identification information; and
an image stabilization controller configured to:
control the driving of the image stabilization lens unit by the image stabilization driving unit to reduce the positional deviation based on the correction shift amount stored in the storage unit; and
select the correction shift amount of the image stabilization lens unit corresponding to the identification information input by the camera information inputting unit, and move a position of the image stabilization lens unit based on the correction shift amount.

2. A lens apparatus comprising:
a magnification-varying lens unit configured to move in an optical axis direction during varying magnification;
an image stabilization lens unit configured to move in a direction perpendicular to an optical axis;
an image stabilization driving unit configured to drive the image stabilization lens unit;
a storage unit that stores a correction shift amount, which is a movement amount for driving the image stabilization lens unit to reduce a positional deviation of an object image formed at one predetermined point on an image plane, the positional deviation being caused by a movement of the magnification-varying lens unit, and the correction shift amount being obtained by detecting at least two magnification-varying positions;
a communication unit configured to communicate with an image pickup apparatus to be connected to the lens apparatus; and
a camera information storing unit that stores the correction shift amount of the image stabilization lens unit corresponding to camera identification information acquired from the image pickup apparatus through the communication unit; and
an image stabilization controller configured to:
control the driving of the image stabilization lens unit by the image stabilization driving unit to reduce the positional deviation based on the correction shift amount stored in the storage unit; and
select the correction shift amount of the image stabilization lens unit, which corresponds to the camera identification information, and shift a position of the image stabilization lens unit based on the correction shift amount.

3. An image pickup system comprising:
a lens apparatus; and
an image pickup apparatus having an image pickup element configured to receive light from the lens apparatus,
wherein the lens apparatus comprises:
a magnification-varying lens unit configured to move in an optical axis direction during varying magnification;
an image stabilization lens unit configured to move in a direction perpendicular to an optical axis;
an image stabilization driving unit configured to drive the image stabilization lens unit;
a storage unit that stores a correction shift amount, which is a movement amount for driving the image stabilization lens unit to reduce a positional deviation of an object image formed at one predetermined point on an image plane, the positional deviation being caused by a movement of the magnification-varying lens unit, and the correction shift amount being obtained by detecting at least two magnification-varying positions;
a camera information inputting unit configured to input identification information of the image pickup apparatus;
a camera information storing unit that stores the identification information input by the camera information inputting unit and the correction shift amount of the image stabilization lens unit corresponding to the identification information; and
an image stabilization controller configured to:
control the driving of the image stabilization lens unit by the image stabilization driving unit to reduce the positional deviation based on the correction shift amount stored in the storage unit; and
select the correction shift amount of the image stabilization lens unit corresponding to the identification information input by the camera information inputting unit, and move a position of the image stabilization lens unit based on the correction shift amount.

4. An image pickup system comprising:
a lens apparatus; and
an image pickup apparatus having an element configured to receive light from the lens apparatus,
wherein the lens apparatus comprises:
a magnification-varying lens unit configured to move in an optical axis direction during varying magnification;
an image stabilization lens unit configured to move in a direction perpendicular to an optical axis;
an image stabilization driving unit configured to drive the image stabilization lens unit;
a storage unit that stores a correction shift amount, which is a movement amount for driving the image stabilization lens unit to reduce a positional deviation of an object image formed at one predetermined point on an image plane, the positional deviation being caused by a movement of the magnification-varying lens unit, and the correction shift amount being obtained by detecting at least two magnification-varying positions;
a communication unit configured to communicate with the image pickup apparatus; and
a camera information storing unit that stores the correction shift amount of the image stabilization lens unit corresponding to camera identification information acquired from the image pickup apparatus through the communication unit; and
an image stabilization controller configured to:
control the driving of the image stabilization lens unit by the image stabilization driving unit to reduce the positional deviation based on the correction shift amount stored in the storage unit; and
select the correction shift amount of the image stabilization lens unit corresponding to the camera identification information, and shift a position of the image stabilization lens unit based on the correction shift amount.

5. A lens apparatus with a mount portion for removably mounting the lens apparatus to an image pickup apparatus, the lens apparatus comprising:
a magnification-varying lens unit configured to move in an optical axis direction during varying magnification;
an image stabilization lens unit configured to move in a direction perpendicular to an optical axis;
an image stabilization driving unit configured to drive the image stabilization lens unit;
a storage unit storing a correction shift amount, which is a movement amount for driving the image stabilization lens unit so as to suppress an optical-axis-perpendicular positional deviation of an object image formed at one predetermined point on an imaging plane of an image pickup apparatus to which the lens apparatus is mountable, the positional deviation being caused by a movement of the magnification-varying lens unit; and
an image stabilization controller configured to:
control the driving of the image stabilization lens unit by the image stabilization driving unit;
acquire user input indicative of a correction shift amount required for an image pickup apparatus to which the lens apparatus has been mounted, determine the required correction shift amount based on the acquired user input, and store the determined correction shift amount in the storage unit; and
control driving of the image stabilization lens unit to suppress the positional deviation for the image pickup apparatus mounted to the lens apparatus for image taking, based on the correction shift amount corresponding to the mounted image pickup apparatus stored in the storage unit.

6. The lens apparatus according to claim 5, wherein the correction shift amount is determined by obtaining the positional deviation for at least two positions of the magnification-varying lens unit.

7. The lens apparatus according to claim 6, further comprising:
an optical switching unit comprising a magnification-varying optical system; and a switch driving portion driving the optical switching unit in a direction perpendicular to the optical axis of the lens apparatus to insert and remove one of the magnification-varying lens units into and out of an optical path of the lens apparatus, wherein the image stabilization controller is configured to:
- determine and store the correction shift amount, in the storage unit, in a case where no magnification-varying lens unit is inserted into the optical path of the lens apparatus, and in a case where the magnification-varying optical system is inserted into the optical path of the lens apparatus; and
- control driving of the image stabilization lens unit based on the correction shift amounts stored in the storage unit.

8. The lens apparatus according to claim 5, wherein the one predetermined point on the image plane is a center of an imaging plane.

9. The lens apparatus according to claim 5, wherein the one predetermined point on the image plane is a point on the optical axis of the lens apparatus.

10. The lens apparatus according to claim 5, further comprising:
- an operating unit configured to enable a user to input the correction shift amount,
- wherein the operating unit has one of a magnification-varying operation unit for controlling a magnification-varying operation of the lens apparatus or a focus adjustment operation unit for controlling a focus adjustment operation of the lens apparatus.

11. The lens apparatus according to claim 10, wherein the operation unit further comprises:
- a correction activating unit configured to assign one of the magnification-varying operation unit or the focus adjustment operation unit as an image stabilization lens driving operation unit configured to drive the image stabilization lens unit to set the correction shift amount; and
- a storage operation unit configured to trigger storing, in the storage unit, of information indicative of a position of the image stabilization lens unit.

12. The lens apparatus according to claim 5, wherein the image stabilization controller is configured to use a signal from an operator for a magnification-varying operation of the lens apparatus or an operator for a focus adjustment operation of the lens apparatus as a signal to drive the image stabilization lens unit to set the correction shift amount.

13. The lens apparatus according to claim 6, further comprising:
- a camera information inputting unit configured to input identification information of an image pickup apparatus to be connected to the lens apparatus,
- wherein the storage unit stores, for plural image pickup apparatuses, an identification information input by the camera information inputting unit and a correction shift amount corresponding to the identification information, and
- wherein the image stabilization controller is configured to select, for image taking, the correction shift amount corresponding to an identification information input by the camera information inputting unit and control driving of the image stabilization lens unit based on the selected correction shift amount.

14. The lens apparatus according to claim 6, further comprising:
- a communication unit configured to communicate with an image pickup apparatus to be connected to the lens apparatus,
- wherein the storage unit stores, for plural image pickup apparatuses, a camera identification information acquired from a connected image pickup apparatus through the communication unit and a correction shift amount corresponding to the identification information, and
- wherein the image stabilization controller is configured to select, for image taking, the correction shift amount corresponding to the camera identification information acquired through the communication unit and control driving of the image stabilization lens unit based on the selected correction shift amount.

* * * * *

UNITED STATES PATENT AND TRADEMARK OFFICE
CERTIFICATE OF CORRECTION

PATENT NO. : 8,860,827 B2
APPLICATION NO. : 13/186529
DATED : October 14, 2014
INVENTOR(S) : Yamamoto It is certified that error appears in the above-identified patent and that said Letters Patent is hereby corrected as shown below:

On the Title Page, item (54) and in the Specification, Column 1, lines 1-5, the title of the invention should read "ZOOM LENS APPARATUS AND IMAGE PICKUP SYSTEM HAVING AN IMAGE STABILIZER WITH A LENS POSITIONAL DEVIATION CONTROL, AND OPERATION UNIT THEREOF"

Signed and Sealed this
Ninth Day of August, 2016

Michelle K. Lee
*Director of the United States Patent and Trademark Office*